(12) United States Patent
Lang et al.

(10) Patent No.: US 6,223,865 B1
(45) Date of Patent: May 1, 2001

(54) GOLF CAR HAVING DISK BRAKES AND SINGLE POINT LATCHING BRAKE

(75) Inventors: Joseph A. Lang, deceased, late of Martinez, by Susan R. Lang, legal representative; Terry Lou Reese, Hephzibah, both of GA (US); James M. Criscuolo, Columbia, TN (US); Donald D. Brown, Thiensville, WI (US); James A. Buckley, Whitfish Bay, WI (US); Scott A. Waterman, Milwaukee, WI (US)

(73) Assignees: Textron Inc., Providence, RI (US); Hayes Brake, LLC, Mequon, WI (US)

( * ) Notice: Subject to any disclaimer, the term of this patent is extended or adjusted under 35 U.S.C. 154(b) by 0 days.

(21) Appl. No.: 09/517,302

(22) Filed: Mar. 2, 2000

Related U.S. Application Data

(60) Provisional application No. 60/122,405, filed on Mar. 2, 1999.

(51) Int. Cl.$^7$ .................................................... F16D 55/00
(52) U.S. Cl. ........................ 188/73.31; 74/512; 188/265
(58) Field of Search ........................ 303/3, 15, 113.4, 303/DIG. 11; 74/512, 513, 514, 473.11, 473.16; 188/72.1, 71.1, 79.61, 77 W, 77 R, 74, 78, 325, 156, 158, 106 F, 265; 180/65.1, 65.3, 65.4, 216, 305, 307, 271, 275, 277

(56) References Cited

U.S. PATENT DOCUMENTS

| | | |
|---|---|---|
| 1,915,286 | 6/1933 | Bleisteom . |
| 1,927,209 | 9/1933 | Gilmore . |
| 1,985,319 | 12/1934 | Gilmore . |
| 2,551,743 | 5/1951 | Huey . |
| 2,816,633 | 12/1957 | Schumann . |
| 2,905,024 | 9/1959 | McCarthy et al. . |
| 2,915,916 | 12/1959 | Hinsey et al. . |
| 3,079,809 | 3/1963 | Fender et al. . |
| 3,511,107 | 5/1970 | Yasiro . |
| 3,698,497 | 10/1972 | Bombardier . |
| 3,822,655 | 7/1974 | Benedict et al. . |
| 3,869,027 | 3/1975 | Chelbowski . |
| 3,993,170 | 11/1976 | Lessard . |
| 4,036,078 | 7/1977 | Muehling . |
| 4,037,487 | 7/1977 | Ahlschwede et al. . |
| 4,076,093 | 2/1978 | Mizuno . |
| 4,218,936 | 8/1980 | Waggoner . |
| 4,278,143 | 7/1981 | Nagai . |
| 4,301,901 | 11/1981 | Jensen . |
| 4,310,064 | 1/1982 | Kazarian, Jr. . |
| 4,315,441 | 2/1982 | Fukuda . |
| 4,519,270 | 5/1985 | Kawaguchi et al. . |
| 4,597,307 | 7/1986 | Kawaguchi et al. . |
| 4,753,541 | 6/1988 | Brown . |
| 4,835,693 | 5/1989 | Smith et al. . |

(List continued on next page.)

*Primary Examiner*—Robert Oberleitner
*Assistant Examiner*—Melanie Talavera
(74) *Attorney, Agent, or Firm*—Harness, Dickey & Pierce, P.L.C.

(57) ABSTRACT

A golf car having a hydraulic fluid brake system. The hydraulic fluid brake system is implemented as a disk brake system which is responsive to hydraulic fluid pressure generated from a master cylinder. A brake pedal and associated linkage provides input to a master cylinder to generate a hydraulic fluid pressure to control a brake caliper assembly. The brake pedal has a range of travel, where a first portion of the range defines a service mode of operation and a second portion of the range defines a parking mode of operation. In the parking mode of operation, the brake pedal and linkage engages a detent to maintain application of the brake to provide a parking mode of operation. An accumulator in the brake system provides an input force to maintain hydraulic fluid pressure sufficient to retain a parking mode of operation.

41 Claims, 15 Drawing Sheets

U.S. PATENT DOCUMENTS

| | | |
|---|---|---|
| 4,850,242 | 7/1989 | Hass et al. . |
| 4,867,289 | 9/1989 | Wooters . |
| 4,872,368 | 10/1989 | Porter . |
| 5,000,294 | 3/1991 | Hunnicutt et al. . |
| 5,020,643 | 6/1991 | Redenbarger . |
| 5,033,592 | 7/1991 | Metzelfeld . |
| 5,058,462 | 10/1991 | Killiany et al. . |
| 5,390,771 | 2/1995 | Hinkens et al. . |
| 5,529,150 | 6/1996 | Buckley et al. . |
| 5,588,335 | 12/1996 | Strait . |
| 5,647,459 | 7/1997 | Buckley et al. . |
| 5,713,189 | 2/1998 | Toman . |
| 5,727,659 | 3/1998 | Brown et al. . |
| 5,785,156 | 7/1998 | Warwick et al. . |
| 5,791,750 | 8/1998 | Spiegelberg . |
| 5,816,371 | 10/1998 | Buckley et al. . |
| 5,848,674 | 12/1998 | Johnson et al. . |
| 5,890,545 | 4/1999 | Smith et al. . |
| 5,950,772 | 9/1999 | Buckley et al. . |

GOLF CAR HAVING DISK BRAKES AND SINGLE POINT LATCHING BRAKE

CROSS REFERENCE TO RELATED APPLICATIONS

This application claims the benefit of priority of U.S. Provisional Application Ser. No. 60/122,405, filed Mar. 2, 1999, the entire contents of which are hereby expressly incorporated by reference into the present application.

BACKGROUND

1. Technical Description

The present invention relates generally to golf cars having disk brakes and, more particularly, to golf cars having hydraulically actuated disk brakes, a single point latching mechanism, and an integrated accelerator pedal and brake pedal release of the brake system when in a parking mode.

2. Description of Related Art

Most golf cars, and other small utility vehicles, have brake systems in one form or another. Examples of such systems may be found with reference to U.S. Pat. No. 4,867,289, U.S. Pat. No. 5,158,415, and U.S. Pat. No. 5,713,189, the disclosures of which are incorporated by reference herein for their technical teachings. While the above referenced patent documents, and other references, discuss application of brakes to utility vehicles and golf cars, brake systems for small vehicles and golf cars may yet be improved to increase the ease of use, feel, performance, serviceability, and the like.

The typical golf car brake system includes a brake pedal and interconnected accelerator pedal. When the brake pedal is depressed a predetermined distance, the brake system operates in a normal or service mode. Depressing the brake pedal further engages a parking mode which maintains the golf car in a stationary position. When engaging the parking mode, most brake pedals have numerous mechanical detent positions to enable progressive application of increasing braking force. In some golf cars, the first detent position does not apply sufficient braking force to maintain the golf car in a stationary position. However, because each detent position often generates an audible click, an operator may assume that the parking brake has been sufficiently engaged when the parking brake has yet to be sufficiently engaged. Further, conventional brake systems are mechanically sprung to return the brake pedal to a non-depressed position. When disengaging the parking brake, such brake systems often generate a particularly loud, audible pop which can be somewhat distracting to the operator.

It is therefor an object of the present invention to provide a brake system for a golf car which significantly improves upon the prior brake systems.

Lightweight off-road utility vehicles used as personnel and cargo carriers, such as golf carts, are much smaller than conventional automobiles used on the highways. Their tires and wheels are much smaller, and the space beneath the vehicle body is much smaller, thus providing much less room for the mounting of braking mechanisms at the rear wheels. While the brakes used on golf cars have historically been very satisfactory for stopping purposes, the service interval between changing of brake pads or shoes has been relatively short, and often is about one year for a golf car that sees extensive use. As labor costs mount for golf course operators and the like, there is a growing perception that is would be desirable to have a brake system whose pads or shoes last longer than conventional brakes, thus reducing the overall costs of providing periodic brake service to the vehicles and allowing the vehicles to be in service for longer periods of time, before being pulled out of service for a brake inspection and possible brake pad/brake shoe replacement. Further, when pulled out of service, there is a continuing need to minimize downtime and to minimize the difficulty and amount of labor required to replace the brake shoes or pads.

Accordingly, another object of the present invention is to provide an improved braking mechanism that will have a long service life for use on the rear wheel of small off-road utility vehicles such as golf cars that have small wheels and wide tires. A related object is to provide a disk brake caliper mechanism that is easy to service, and that requires minimal disassembly to change the replaceable brake pads within the brake caliper assembly. A further object is to provide an extremely compact construction for a robust hydraulic disk brake assembly which is able to fit within the very confined space in the vicinity of the wheel hub and wheel rim of a small-size off-road vehicle such as a golf car. A related object is to provide a compact construction for a brake caliper assembly which features excellent parking braking power and a very long service life between brake pad changes. Another object is to provide an easily-assembled yet compact brake caliper assembly that is of very low profile, such that it can fit between a small-diameter wheel rim and the central cylindrical housing portion of a hub and rotor assembly on a conventional light-weight utility vehicle having a small diameter wide wheel rim associated with wide-profile tires such as those found on a golf car.

SUMMARY OF THE INVENTION

The present invention is directed to a golf car including a frame supported on a plurality of wheels. A prime mover provides driving force to selected wheels to displace the golf car. The golf car also includes an operator or passenger area supported by the frame and an integrated brake pedal and accelerator pedal assembly. A hydraulically operated brake system receives input from the brake pedal and generates an output to control a hydraulically operated braking device. The brake system operates in a normal mode by partially depressing the brake pedal, and the brake system operates in a parking mode by depressing the brake pedal further. When the brake system is in the parking mode, the brake system may be released by depressing either the brake pedal or accelerator pedal.

The present invention is also directed to a brake system for a golf car including an integrated brake pedal and accelerator pedal assembly. A hydraulic brake actuation system receives input from the brake pedal and generates an output to control a hydraulically operated braking device. An accumulator stores braking energy when in a parking mode and maintains a predetermined minimum hydraulic pressure throughout the brake system. The brake system operates in a normal mode by partially depressing the brake pedal, and the brake system operates in a parking mode by depressing the brake pedal further. When the brake system is in the parking mode, the brake system may be released by depressing one of the brake pedal or accelerator pedals.

The present invention is also directed to a golf car including a frame supported on a plurality of wheels. A prime mover provides driving force to selected ones of the plurality of wheels to displace the golf car. An integrated brake pedal and accelerator pedal assembly includes a brake pedal having a range of travel. A first portion of the range of travel defines a service mode of operation, and a second portion of the range of travel defines a parking mode of operation. The integrated brake pedal and accelerator pedal assembly includes a lock position for the parking mode of operation and generates a single audible sound when depressed to the lock position. A hydraulically operated brake system receives input from the brake pedal and generates an output to control a hydraulically operated braking device. When the brake system is in the parking mode, the brake system may be released by depressing one of the brake pedal or accelerator pedal.

This invention is also directed to a golf car including a frame supported on a plurality of wheels. A prime mover provides driving force to selected ones of the plurality of wheels to displace the golf car. An integrated brake pedal and accelerator pedal assembly. A hydraulically operated brake system receives input from the brake pedal and generates a hydraulic output signal. A brake rotor attaches to at least one of the wheels of the golf car. A first caliper assembly has brake pads displaceable in accordance with the hydraulic output signal. The brake pads contact the brake rotor to cause friction. The friction retards movement of the brake rotor and associated wheel. The brake system operates in a normal mode by partially depressing the brake pedal. The brake system operates in a parking mode by depressing the brake pedal further. When the brake system operates in the parking mode, the brake system may be released by depressing one of the brake pedal or accelerator pedals.

For a more complete understanding of the invention, its objects and advantages, reference should be made to the following specification and to the accompanying drawings.

BRIEF DESCRIPTION OF THE DRAWINGS

The drawings, which form an integral part of the specification, are to be read in conjunction therewith, and like reference numerals are employed to designate identical components in the various views.

DESCRIPTION OF THE PREFERRED EMBODIMENT

Figure 1:
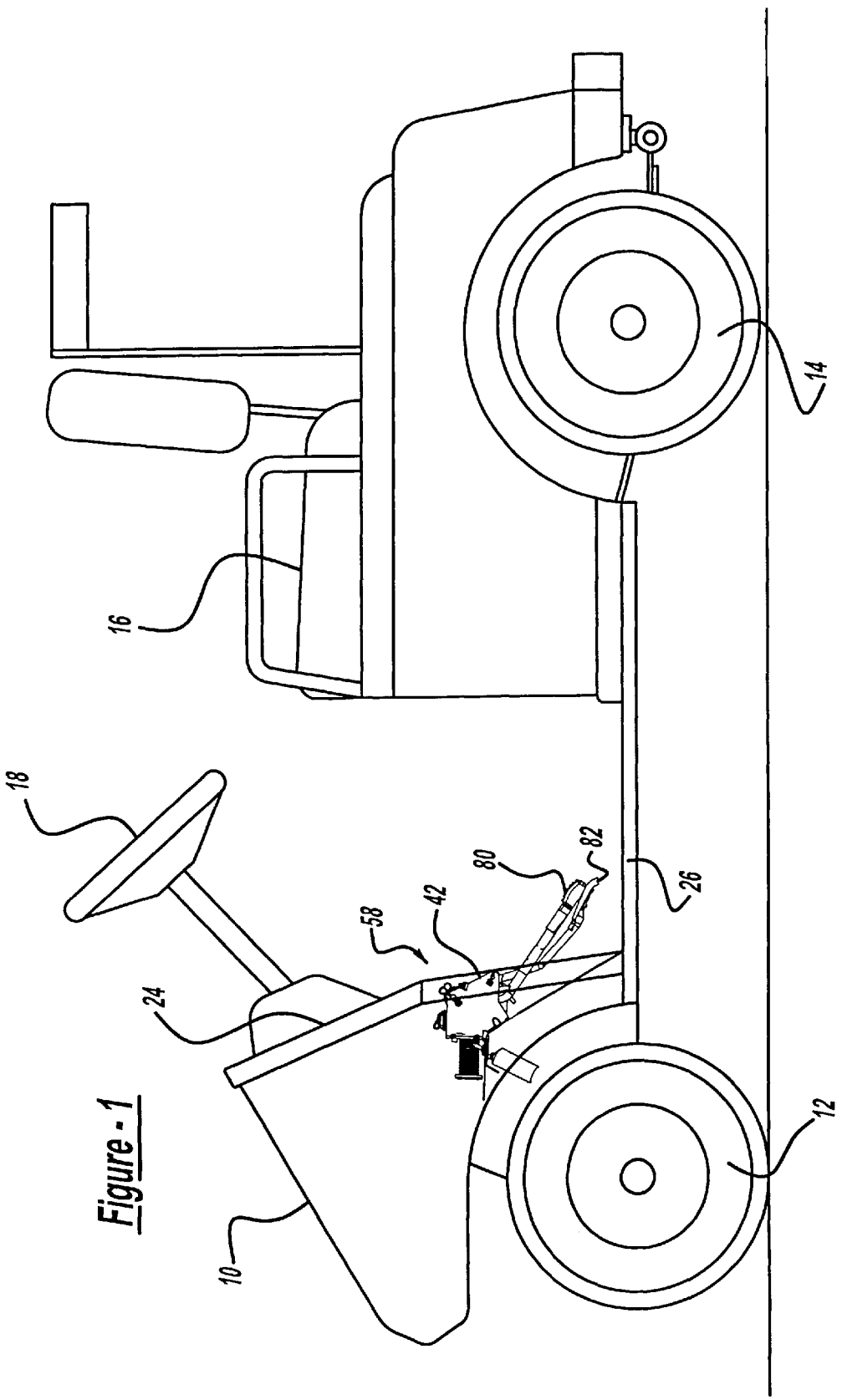
FIG. 1 is an elevational, partial cut-away view of a golf car including a brake system arranged in accordance with the principles of the present invention.

FIG. 1 depicts a golf car 10 having a brake system arranged in accordance with the principles of the present invention. Golf car 10 includes a pair of front wheels 12 and a pair of rear wheels 14. Rear wheels 12 preferably operate as steering wheels to control the direction of travel of golf car 10. Rear wheels 14 preferably function as drive wheels for propelling golf car 10.

Golf car 10 includes a seat 16 which preferably accommodates a driver and a passenger. Golf car 10 also includes a steering wheel 18 which controls the direction of front wheels 12. An accelerator pedal 82 and a brake pedal 80 enable the operator to control acceleration and braking of golf car 10. Accelerator pedal 82 and brake pedal 80 preferably are suspended from support members which hang generally downwardly from underneath a front cowling 24, as will be described herein.

Still referring to FIG. 1, an entire brake actuator and release assembly 50 is configured as a modular unit mounted above the floorboard 26 and at least partially beneath the front cowling 24. It therefore lacks any underhanging components that extend beneath the floorboard 26. This configuration is advantageous for several reasons. For instance, there is no risk that any components of the brake system 50 will be damaged by obstructions over which golf car 10 may travel. Moreover, the system components are isolated from corrosive substances over which the vehicle may travel such as water, fertilizers, etc.

Figure 2:
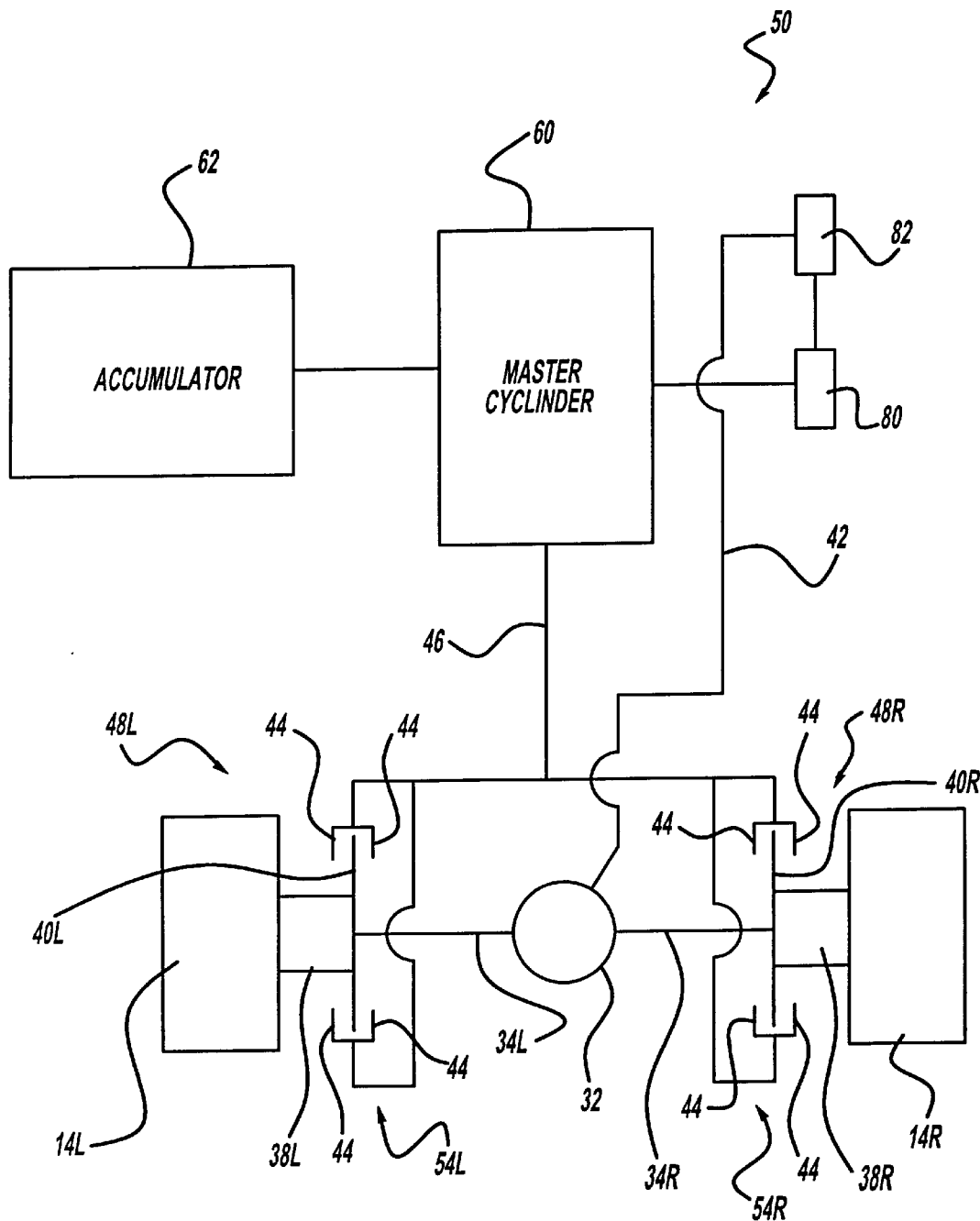
FIG. 2 is a block diagram of the brake system arranged in accordance with the principles the present invention.

FIGS. 2 depicts a particular feature of golf car 10, namely, brake system 50. Accelerator pedal 82 controls operation of an electric motor 32 which is powered by a source of electrical energy (not shown). Electric motor 32 includes one or a pair of output shafts 34 which control drive to respective hubs 38. It should be noted that reference numerals in the drawings may include an R or L suffix to designate a component as corresponding to the left or driver's side or the right or passenger's side of golf car 10. Respective hubs 38 drive rear wheels 14 to propel golf car 10. While motor 32 is described herein as an electric motor, one skilled in the art will recognize that rear wheels 14 may be propelled by a gasoline powered engine and transmission or other suitable power source.

Brake system 50 will generally be described herein as a hydraulically actuated brake system wherein displacement of brake pedal 80 generates a hydraulic force to operate a braking element, such as a disk, drum, or band brake system, as will be described herein. Brake system 50 includes brake pedal 80 which connects to and displaces a linkage 42. Linkage 42 provides an input to a master cylinder 60. Master cylinder 60 operates generally as a conventional master cylinder in which depressing brake pedal 80 provides an input to master cylinder 60 which generates an increase in hydraulic fluid pressure output on hydraulic control line 46.

Hydraulic control line 46 provides fluid pressure to caliper assemblies 48. Each caliper assembly 48 includes opposing pads 44. A brake rotor 40 moves rotationally in accordance with hubs 38. Pads 44 apply a frictional force to brake rotor 40 to retard movement of brake disk 52, thereby applying a braking force upon wheels 14. Caliper assemblies 48 thus operate generally as is known to one skilled in the art. In order to maximize braking force, an optional second pair of caliper assemblies 54 may be arranged to provide additional retarding force upon brake rotor 40. A particularly attractive feature of utilizing two caliper assemblies on a single brake disk is to compensate for space limitations inherent with the generally small diameter of wheels 14 of a typical golf car 10.

As described above, depressing brake pedal 80 causes master cylinder 60 to generate a hydraulic fluid output pressure on hydraulic control line 46 which is applied to caliper assemblies 48 and to calipers assemblies 54 if present. An increase in hydraulic fluid pressure causes brake pads 44 to move toward brake rotor 40 to generate a frictional force which retards movement of wheels 14.

Brake system 50 has two modes of operation. A first mode of operation, a service mode, of brake system 50 reduces the speed of golf car 10 to a lower speed, a stop, or to prevent unwanted acceleration of golf car 10 when going down hill. A second mode of operation, a parking mode, of brake system 50 maintains golf car 10 in a stopped position until the parking mode has been released.

Brake pedal 80 has a range of travel for causing master cylinder 60 to output a hydraulic fluid pressure suitable for stopping golf car 10 or maintaining golf car 10 in a stopped position. A first portion of the range of travel of pedal 80 effects a service mode of operation for reducing the speed of golf car 10 or to prevent unwanted acceleration of golf car 10 when going down hill. Depressing brake pedal 80 further places brake system 50 in a parking mode. Linkage 42 includes a detent setting for engaging and holding brake pedal 80 in a predetermined position while in the parking mode. When in this parking mode, the accumulator 62 provides a supplemental input to master cylinder 60 to compensate for any hydraulic fluid pressure drop through seal leakage and the like. Accumulator 62 maintains hydraulic fluid pressure so that caliper assemblies 48 provide suitable parking brake force upon brake rotor 40 and associated wheels 14.

Brake pedal 80 and linkage 42 cooperate to include a single detent which is engaged when brake pedal 80 travels a predetermined distance so as to cause master cylinder 60 to output a sufficient hydraulic fluid pressure to prevent displacement of wheels 14. When brake pedal 80 has engaged a detent position to define a parking mode of operation, brake system 50 can be disengaged from the parking mode of operation by depressing either brake pedal 80 or accelerator pedal 82. Accelerator pedal 82 is mechanically linked to brake pedal 80 to enable release of the brake system 50 from the parking mode of operation.

Figure 3:
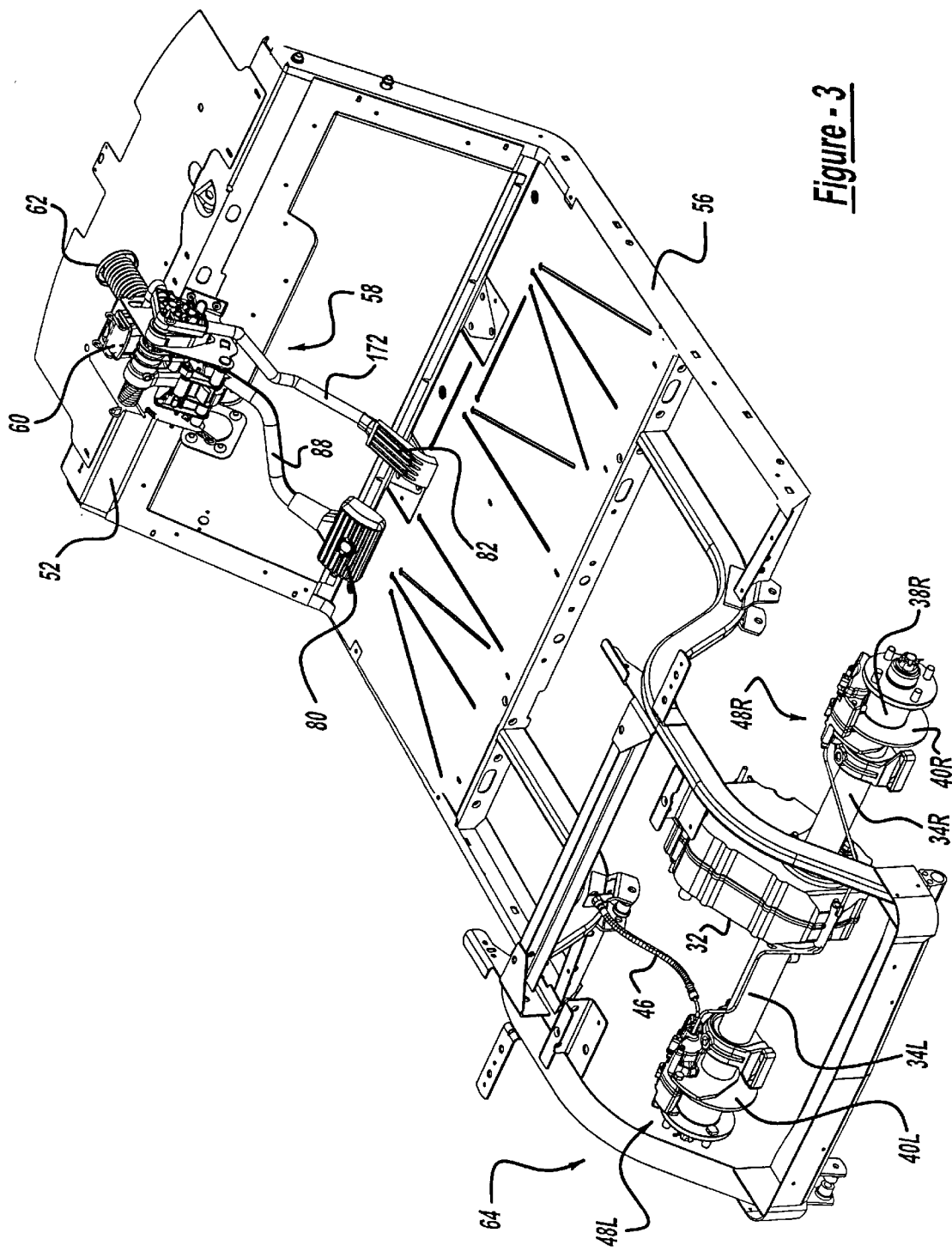
FIG. 3 is a perspective view of the golf car support frame and components of the brake system.
Figure 4:
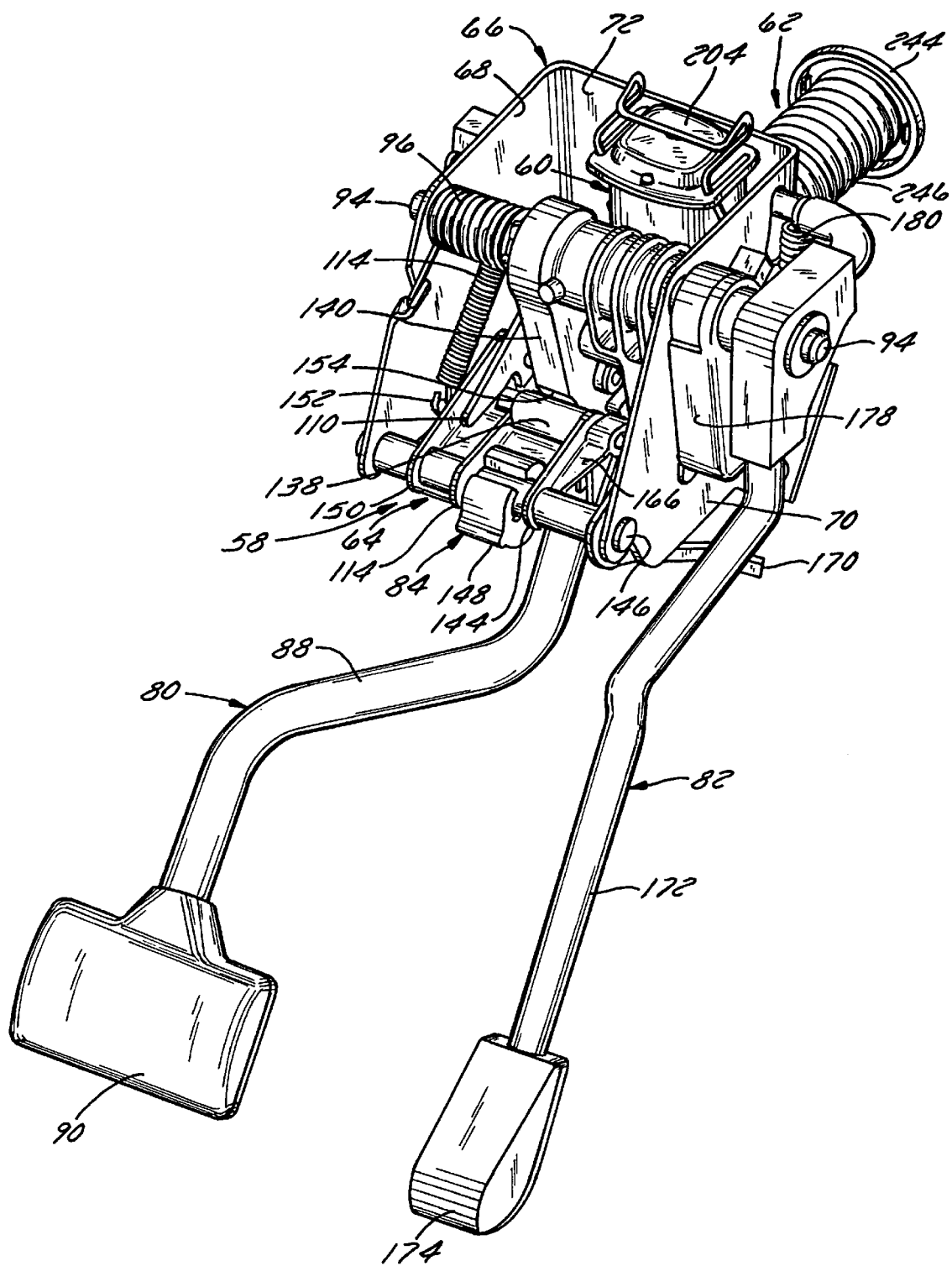
FIG. 4 is an assembled view of the brake and accelerator pedal assembly.

With particular reference to FIG. 3, golf car 10 includes a vehicle frame 56. Frame 56 provides a support to which brake and accelerator pedal assembly 58 connects. Rear axle assembly 64 supports a rear portion of frame 56 via a suspension (not shown). As shown in FIG. 3, brake and accelerator pedal assembly 58 mounts to an upper portion 52 of frame 56 so that brake pedal 80 is suspended downwardly on lever arm 88 and accelerator pedal 82 is suspended downwardly upon accelerator arm 172.

Several features of brake system 50 will now be described. When the parking mode is engaged, brake system 30 generates a single audible click or pop sound. The sound indicates that the parking mode has been properly engaged by the operator. The benefit of a single audible sound is to provide a clear indication that the parking mode has been engaged. This feature improves upon conventional braking systems where multiple audible sounds may be generated when engaging a parking mode. In such systems the operator could incorrectly assume that while the brake pedal is locked in a position that generates a sufficient braking force, an insufficient parking brake force could be applied.

Brake system 50 inherently has less hysteresis associated with stiction than brake systems utilizing mechanical components, particularly hysteresis caused by cables running over contact points. Reduced hysteresis provides a brake system 50 which requires less force for selecting either the service or parking modes verses a mechanical system which requires greater force to properly engage a service or parking mode. Because hysteresis is inherently less in a hydraulic system and because hysteresis in mechanical systems typically increases over time, hydraulic brake system 50 significantly reduces hysteresis concerns problem over the lifetime of golf car 10.

Hydraulic brake system 50 has a self-adjusting system which compensates for wear in brake pads 44. Self adjustment occurs because the system allows extra fluid from the hydraulic reservoir of master cylinder 60 to be added to the system. Using caliper design features well known in the art, the seals of the hydraulic cylinders in the brake calipers insure a uniform return of brake pads 44 to equal distances away from brake disk 52. These benefits may be further realized by utilizing a bladder-based hydraulic reservoir which provides several additional advantages. The bladder type hydraulic reservoir ensures minimal loss of hydraulic fluid through the top of the reservoir. This avoids introduction of contaminants such as water, dirt, and atmospheric transfer which may occur.

Hydraulic brake system 50 utilizes a synthetic fluid which is non-hygroscopic. A non-hygroscopic fluid does not absorb any fluid. Conventional brake fluid, on the other hand, absorbs moisture directly through rubber hoses and seals and other places where conventional brake systems are open to the atmosphere, including the reservoir. This transfer occurs even through seals which are frequently water vapor permeable. Thus, while many seals resist moisture in a liquid form, many such seals do not resist moisture in the form of a gaseous vapor. Hygorscopic brake fluid also often accelerates internal breakdown of metal brake system parts, while non-hygroscopic, synthetic fluid significantly reduces internal breakdown of metal brake system parts. Non-hygroscopic fluids provide a non-polar property, which yields an environmentally friendly brake fluid. Most grass plants will not absorb the non-hygroscopic, synthetic fluid, while typical conventional brake fluids may be absorbed by and damage plant life yet.

Conventional brake fluids, while possibly avoiding water absorption, also absorb air. The absorption of air into the brake fluid creates a spongy brake feeling and can also raise other issues such as cavitation and outgassing. Outgassing occurs when a vehicle remains exposed for a lengthy period of time in a high altitude condition. Bringing the golf car down to lower elevations and thus higher atmospheric pressure causes air entrained in the liquid at higher elevations to boil off at the lower elevations. This introduces variation into the hydraulic system.

Hydraulic brake system 10 also provides a positively-sealed, pressurized hydraulic brake system. In a parking mode, hydraulic brake system 10 generates at least 750 pounds per square inch (PSI). This pressurization exceeds internal hydraulic fluid pressure typically utilized in conventional hydraulic braking systems, particularly at rest. In conventional hydraulic braking systems, the parking mode is engaged through a mechanical-type emergency brake or transmission lock. Brake system 50 utilizes a hydraulic system which is continuously pressurized when the golf car is not in use and the brake system is engaged in a parking mode. To achieve a positive seal in response to relatively high static hydraulic pressures present in brake system 50, eleastometer seals replace metal-to-metal contact on all sealing surfaces, including air bleeder valves found on caliper assemblies 48.

Hydraulic brake system 50 also includes two separate damping systems to provide a controlled release of brake pedal 82. A first damping system is a mechanical damping system implemented by applying a damping grease to a pivot shaft housed within a stationary sleeve. The helical spring returns brake pedal 82 to its non-operative position. The damping grease has a viscosity which varies in accordance with the displacement speed of the pivot shaft. At slower speeds, the damping grease acts as a lubricant. At higher speeds, the damping grease provides a viscous action between two adjacent surfaces which retards the rate at which the pivot shaft may be rotated with respect to the stationery sleeve. Thus, the damping grease is applied to both the pivot shaft and the stationary sleeve. As the pivot shaft rotates with respect to the stationary sleeve, the viscous action ensures a controlled rate of upward travel of brake pedal 82. This viscous action also significantly reduces the normal multiple vibration pulses that occur at the top of the brake pedal stroke in convention mechanical systems.

A second damping system utilizes a dampened hydraulic fluid flow to maintain a controlled return of parking brake 82 pedal to its non-operative position. This controlled rate of upward movement minimized noise inherent in the stopping of brake pedals at the top of travel in conventional brake systems.

Hydraulic fluid travels through a spiral grooved return path to restrict hydraulic fluid flow during pedal return. The fluid damping path enables a fluid flow return rate which encourages the brake pedal upward at a reasonable rate so as to maintain contact with the foot of the operator while the operator lifts upward with his or her foot. Thus, the operator feels the brake pedal firmly on the bottom of the operator's foot, while the return rate is sufficiently slow to prevent banging when the brake pedal reaches the top of travel.

Referring now to FIGS. 4–8, a preferred mode of practicing the invention will be described. The brake actuator and release assembly 50 includes as its major components 1) a master cylinder 60, 2) a hydraulic accumulator 62, and 3) an integrated brake pedal and accelerator pedal assembly 58. All of these components are mounted on a common support bracket 66 that is formed from a single metal stamping. As best seen in FIGS. 4–8, the support bracket 66 has an open rear end, inboard and outboard sidewalls 68 and 70, and a front wall 72 connecting the sidewalls 68 and 70 to one another. Mounting flanges 74, 76, and 78 extend outwardly from the sidewalls 68 and 70 and the front wall 72 for connection to a support such as the front wall 42 of the operator's compartment.

The integrated brake pedal and accelerator pedal assembly 58 and the hydraulic accumulator 62 can be used either in combination or independently of one another and are applicable to the illustrated brake system 50 as well as to a variety of other systems. Each of these components will be described in turn.

The integrated brake pedal and accelerator pedal assembly 58 is usable with the hydraulic brake system 50 as well as a more traditional mechanical cable-actuated brake system. It includes a brake pedal 80, an accelerator pedal 82, and a locking mechanism 84. The assembly 58 can perform several distinct functions. First, the brake pedal 80 can be actuated to perform a service braking operation. Second, the locking mechanism 84 can latch the brake pedal 80 in a locked, actuated position to hold the service brakes 52 in their engaged position. Third, the brake pedal 80 can operate, in conjunction with the accumulator 62, to facilitate brake pedal latching and store energy to help assure that the brakes 52 will remain in their locked position despite creep that may occur within the system. Fourth, the locking mechanism 84 can be released using either the brake pedal 80 or the accelerator pedal 82 without actuating any secondary brake release mechanism.

Figure 6:
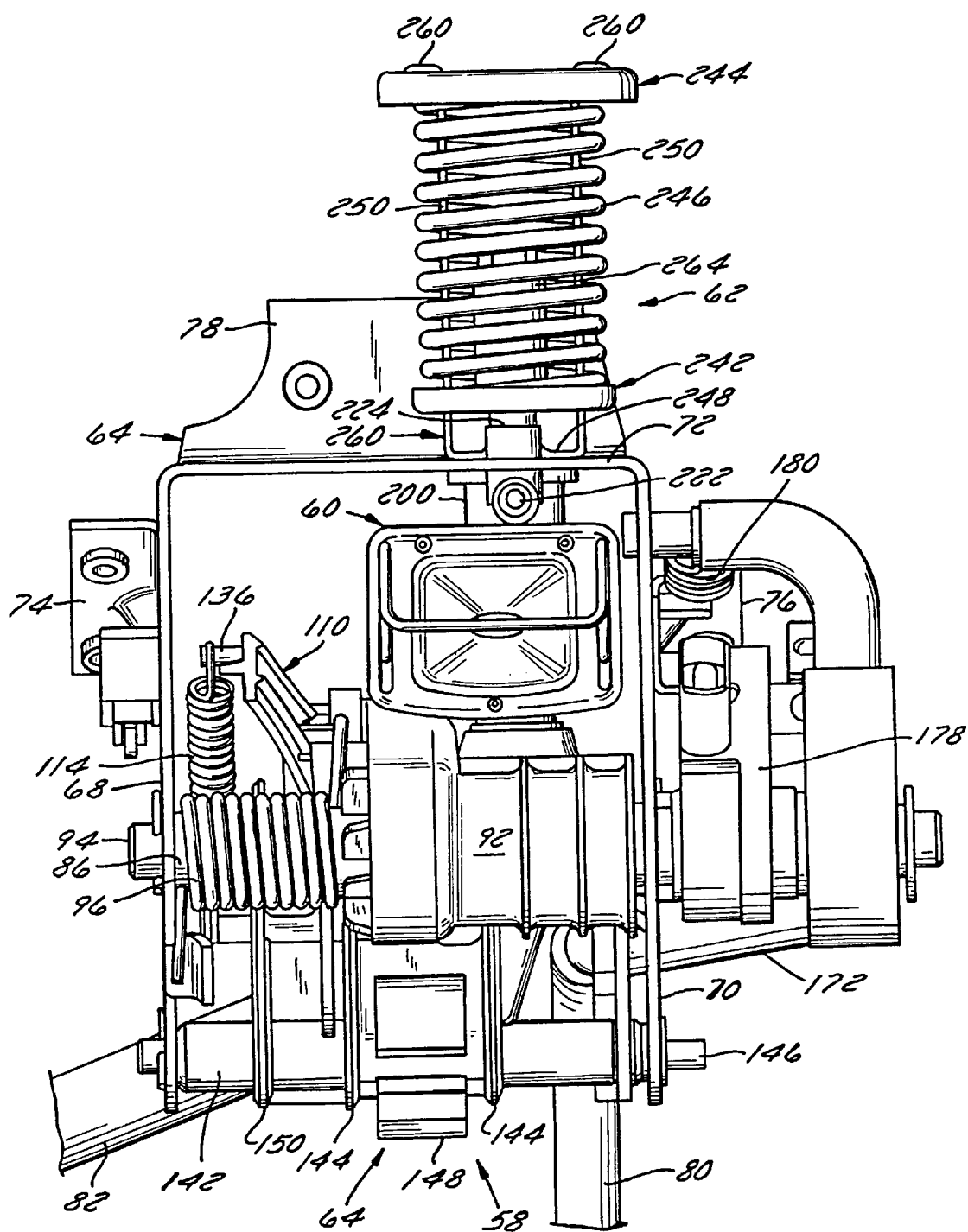
FIG. 6 is a top view of the brake pedal and accelerator pedal assembly.
Figure 7:
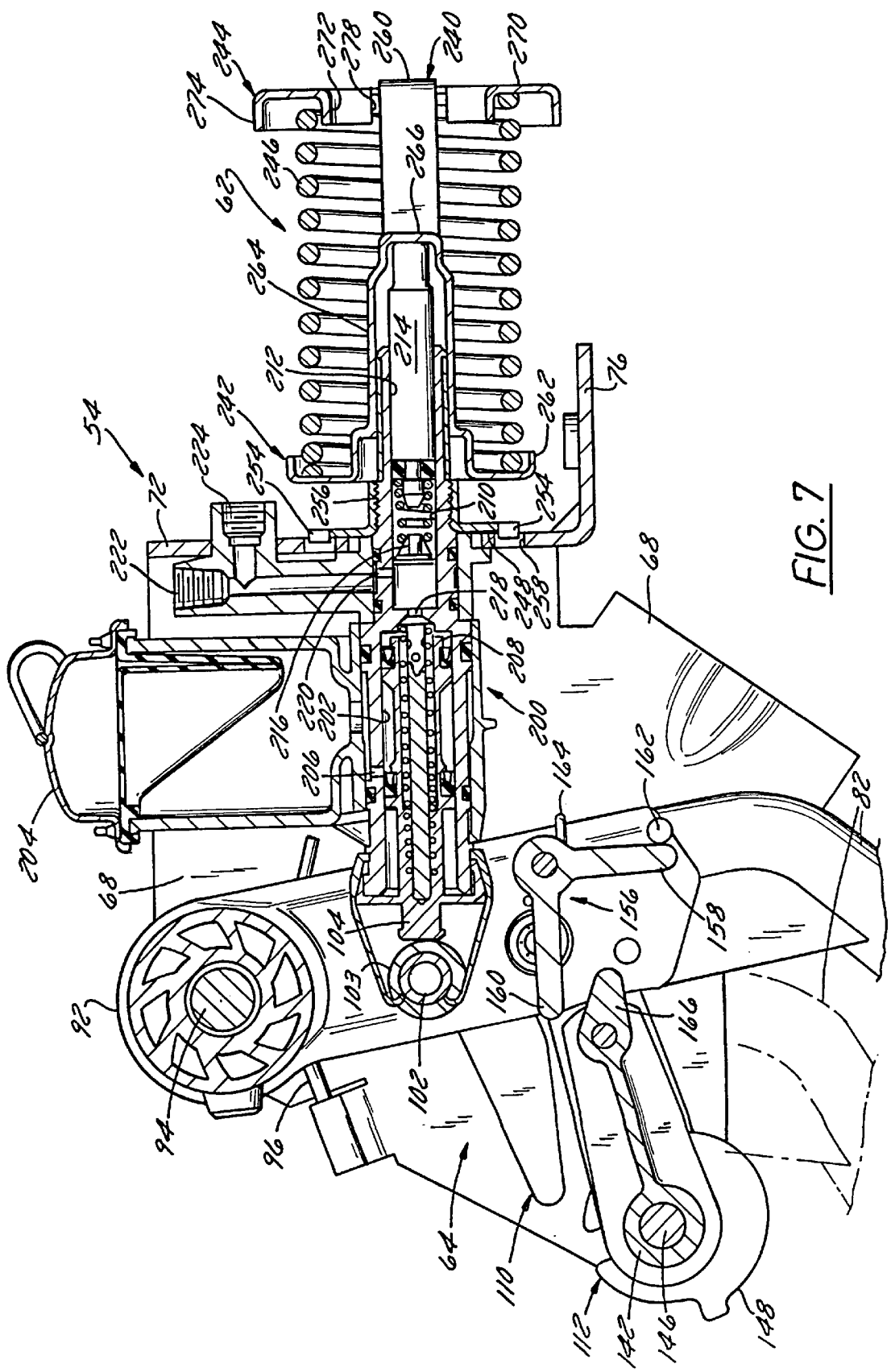
FIGS. 7 and 8 are a partial, vertical sectional views of the brake pedal and accelerator pedal assembly.
Figure 8:
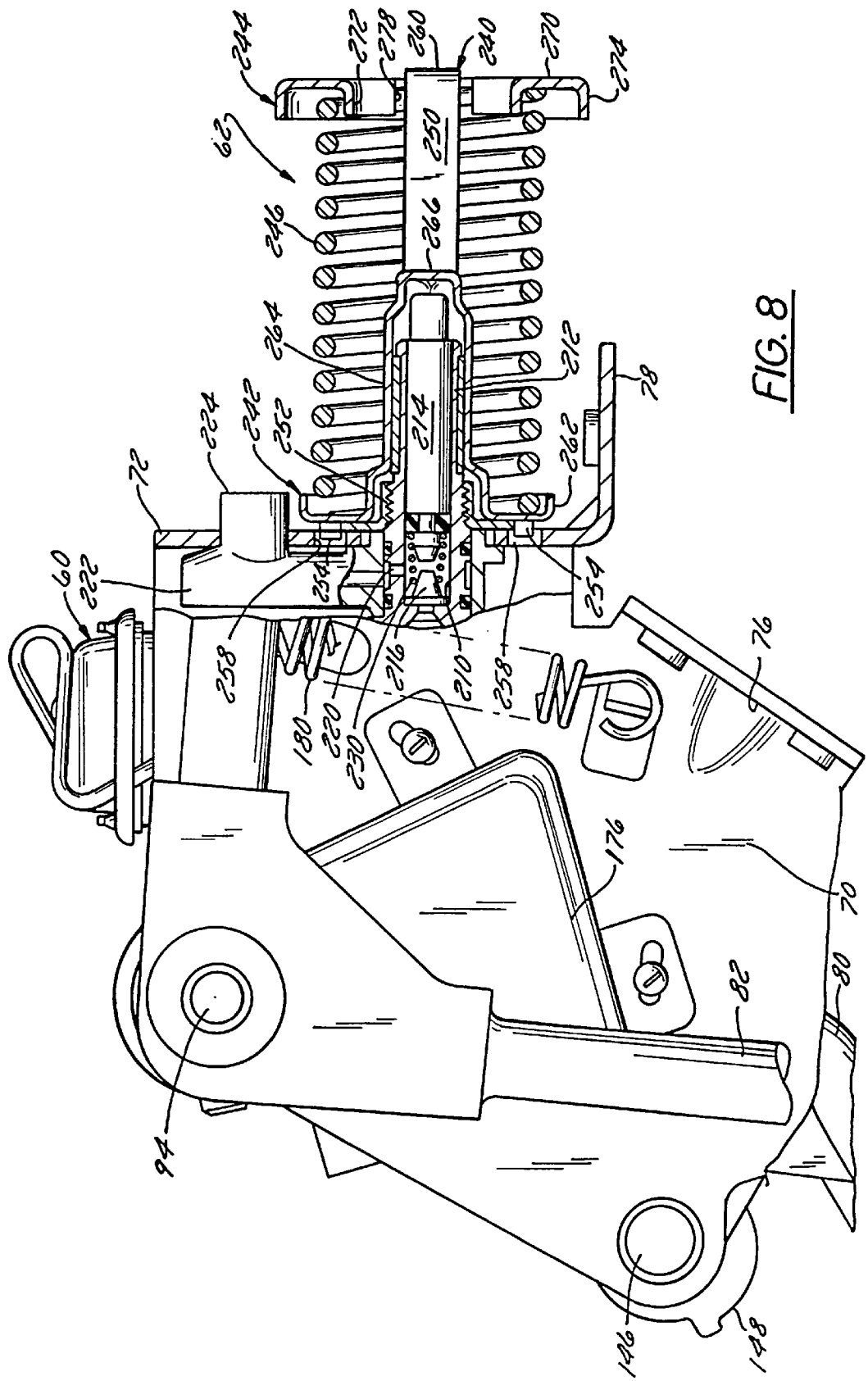

The brake pedal 80 includes a pivot shaft 86, a lever arm 88 extending downwardly from the pivot shaft 86, and a pad 90 mounted on the bottom end of the lever arm 88. As best seen in FIGS. 6, 7, and 8, the pivot shaft 86 is mounted on a plastic sleeve 92 so as to be rotatable with respect thereto, and the plastic sleeve 92 is, in turn, mounted on a main pivot shaft 94. Shaft 94 is rotatably supported on the support bracket 66 and also serves as the pivot shaft for the accelerator pedal 82 (discussed below). The pivot shaft 86 is lubricated via a synthetic damping grease injected into the space between the pivot shaft 86 and the plastic sleeve 92. The damping grease preferably that comprise one that exhibits good lubrication characteristics at low rotational velocities but that actually serves to damp or inhibit shaft rotation at higher rotational velocities. The preferred grease is NYE PG44A, which is manufactured by NYE Lubricants, Inc.. This grease is an extremely stiff consistency, inorganically gelled, water resistant, rust-inhibited damping grease based on a high molecular weight polymeric-base oil. The lever arm 88 preferably is formed from steel encased in a plastic sleeve (not shown) in order to protect the steel from corrosion. The pad 90 may comprise any suitable foot actuated pad mounted on the end of the lever arm 88. A torsion spring 96, serving as a brake pedal return spring, is mounted on the pivot shaft 86 on one side of the lever arm 88. In addition, a plastic block 98 is mounted on the upper surface of the lever arm 88 to form part of the lock mechanism 84 as detailed below.

Figure 5:
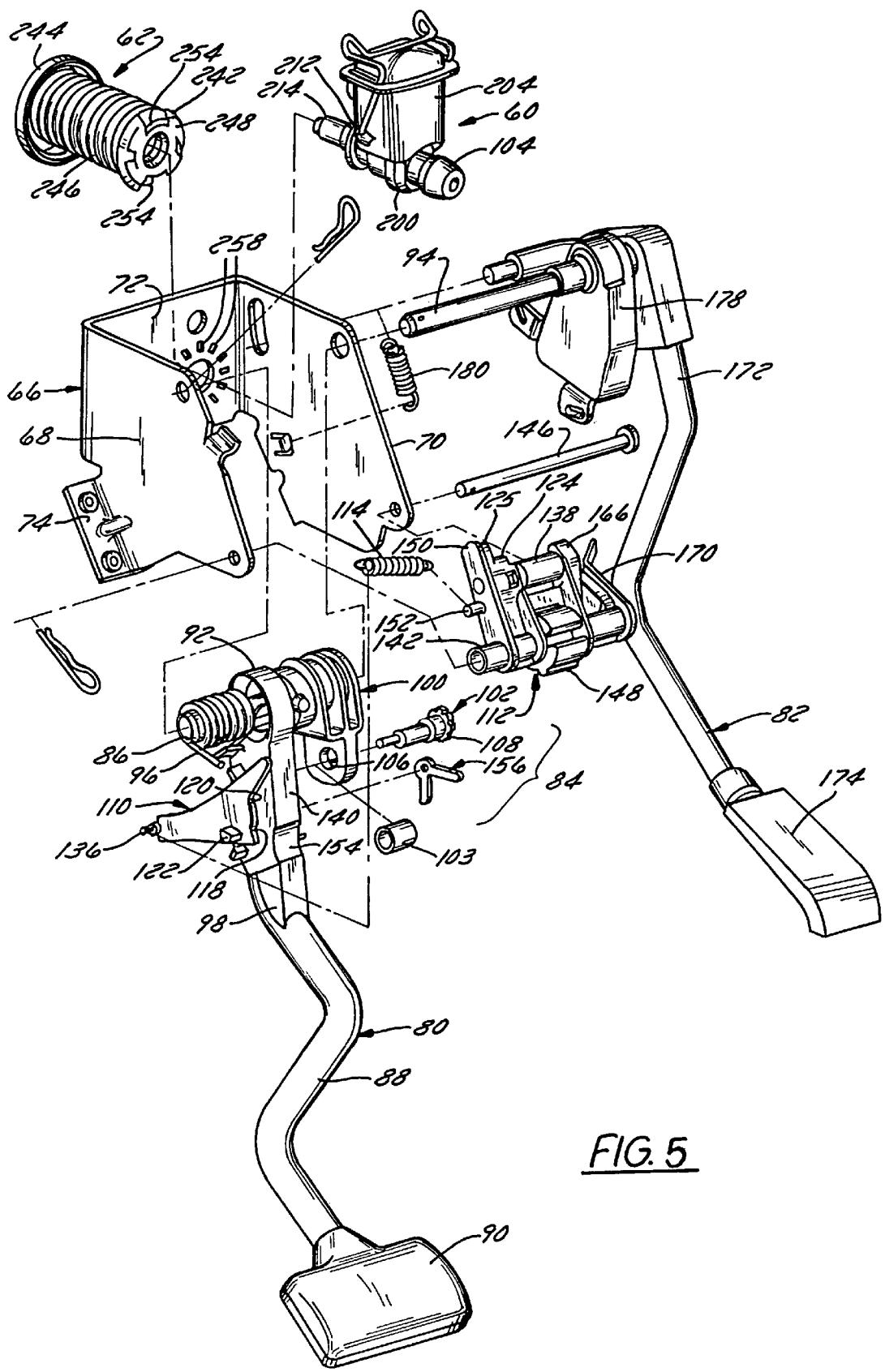
FIG. 5 is an exploded view of the brake pedal and the accelerator pedal assembly.

Referring particularly to FIG. 5, a master cylinder actuating pin support arm 100 is mounted on the pivot shaft 86 adjacent the inboard side of the lever arm 88 so as to rotate with the lever arm 88. An actuating pin 102 is mounted on the support arm 100 so as to rotate with the pivot shaft 86. The pin 102 is coupled to a main piston 104 of the master cylinder 60 via a roller 103 and a strap 105 so that the brake pedal 80 and master cylinder piston 104 always move together. The actuating pin 102 comprises an eccentric pin that is mounted in an aperture 106 in the support arm 100 so as to extend laterally toward the brake lever arm 88. A head 108 on the pin 102 can be rotated to rotate the thicker portion of the eccentric pin 102 either towards or away from the master cylinder main piston 104, thereby eliminating any play or dead space between the brake pedal 80 and the master cylinder main piston 104 after assembly of all components.

The locking mechanism 84 is operable to automatically latch the brake pedal 80 in its locked position upon depression of the brake pedal 80 to a latch point and to automatically unlatch the brake pedal 80 from its locked position to release the brakes 52 upon brake pedal overtravel beyond the latch point. The locking mechanism 84 also is configured to release the brake pedal 80 under power of the accelerator pedal 82. The locking mechanism 84 may comprise any structure having at least one of 1) single point latching capability, 2) the ability to release the brakes 52 upon brake pedal overtravel beyond its latched position, and 3) a kickoff mechanism that permits accelerator pedal release of the brake pedal 80. The illustrated locking mechanism 84 includes the block 98 on the brake pedal lever arm 88, a control arm 110 pivotally mounted on the brake pedal 80, a swing arm 112 pivotally mounted on the support bracket 66, and an over-center spring 114 that is coupled to the control arm 110 and to the swing arm 112 so as to bias the swing arm 112 downwardly during service braking and to bias the swing arm 112 upwardly during a latch and release cycle.

The control arm 110 comprises a metal plate pivotally mounted on the block 98 of the brake pedal 80 via a pivot pin. Control arm 110 has inner and outer faces and front and rear ends. The rear end presents detents 118 and 120, and a lug 122 is mounted on the outer face near the rear end near the axis of the pivot pin. During a brake lock and release cycle, detents 118 and 120 cooperate with a dog or pawl 124 on the swing arm 112. A cushioned stop is mounted on the inner face of the control arm 110 in front of the pivot pin. The stop has first and second arcuate surfaces that selectively engage corresponding first and second cushioned posts on the block 90 during the brake pedal lock and release cycle as detailed below. Finally, a post 136 extends outwardly from a front end portion of the outer face of the control arm 110 for connection to a front end of the over-center spring 114.

The swing arm 112 supports the dog 124 and the cam 125. It also supports a cam follower 138 that rides along a cam 140 on the block 98. The entire swing arm 112 is mounted on a pivot tube 142 that extends laterally across the support bracket 66 and that is rotatably supported on a support pin 146. Support pin 146 is, in turn, mounted in apertures in the opposed sidewalls 68 and 70 of the support bracket 66. A pair of cam follower support arms 144 extend forwardly from the pivot tube 142 in a spaced-apart relationship. The cam follower 138 is rotatably mounted on the front ends of the support arms 144, and a cushioned elastomeric bumper 148 is mounted on the rear ends of the support arms 144. The cam follower 138 comprises a roller mounted on the support arms 144 by a roll pin. The bumper 148 serves as a stop for the brake pedal 80 when the brake pedal is in its at rest or fully released position seen in FIG. 7. The dog 124 is positioned laterally outwardly of the outboard cam follower support arm 144 and is configured to cooperate with the detents 118 and 120 on the control arm 110. The cam 125 is formed from a common stepped lug with the dog 124 and is positioned so as to be engaged by the lug 122 on the control arm 110 during a latching operation. A spring support bracket 150, disposed outboard of the dog 124, supports a post 152 to which the over-center spring 114 is connected. The locations of the posts 152 and 136 on the swing arm 112 and the control arm 110 are selected relative to 1) one another, 2) the rotational axis of the cam follower, 3) the pivot axis of the brake pedal 80, and 4) the pivot axis of the swing arm 112 to cause the spring 114 to move across the pivot axis of the swing arm 112 at selected phases of the brake pedal depression and return processes so as to selectively assist brake pedal locking and unlocking. In the illustrated embodiment, the over-center spring is 30°–40° below the horizontal when it is in its first over-center position and a corresponding amount above the horizontal when it is in the second over-center position.

The block 98 is mounted directly on the upper surface of the brake pedal lever arm 88 and serves as a support structure for several other components of the locking mechanism 84. It has the cam 140 formed directly on the upper or rear surface thereof. The cam 140 is straight along the majority of its length but has an arcuate portion 154 at its lower end surface formed from a cutout in the block 98. Arcuate portion is dimensioned such that the cam follower 138 will rest in the arcuate portion 154 in a locked position of the brake pedal 80.

A generally L-shaped toggle arm 156 is pivotally mounted on the inner lateral surface of the block 98 adjacent the swing arm 112. The toggle arm 156 includes 1) a first leg 158 and 2) a second leg 160 that extends generally orthogonally from the first leg 158. The first leg 158 is biased into contact with a post 162 on the block 98 by a return spring 164. The second leg 160 cooperates selectively with a lug 166 on the swing arm 112 so as to prevent swing arm pivoting motion during the initial phase of brake pedal depression and to subsequently permit the swing arm 112 to fall into its locking position when the lug 166 clears the second leg 160, thus allowing only one contact sound to be heard.

Finally, a kickoff arm 170 is mounted on the inboard end of the pivot tube 142 at a location beyond the inboard cam follower support arm 144. The kickoff arm 170 extends forwardly and outwardly from the pivot tube 142 so as to extend beyond the inboard sidewall 70 of the support bracket 66 and so as to be engaged by the accelerator pedal 82 upon initial accelerator pedal depression.

The accelerator pedal 82 is mounted on the inner distal end of the pivot shaft 94 at a location outside of the inboard sidewall 70 of the support bracket 66. It includes 1) a lever arm 172 that extends downwardly from the pivot shaft 94 and 2) a pad 174 that is mounted on the distal end of the lever arm 172. A portion of the lever arm 172 is positioned closely adjacent the kickoff arm 170 so as to engage the kickoff arm 170 upon initial accelerator pedal depression. In addition, a non-contact accelerator pedal position sensor 178 is positioned inside the lever arm 172 in order to provide an indication of accelerator pedal actuation. The accelerator pedal 82 is biased to its deactuated position by a return spring 180.

In operation, the integrated brake pedal and accelerator pedal assembly 54 assumes the position illustrated in FIGS. 5–6 when the brakes 52 are not engaged. At this time, the brake pedal 80 assumes an at rest or fully released position in which it is pivoted to its rearward-most extent in which the front face on the block 98 engages the bumper 148 on the swing arm 112. The cam roller 138 on the swing arm 112 is located at its maximum possible distance from the arcuate portion 154 of the cam 140. In addition, the over-center spring 114 is in its first over-center position in which it biases the control arm 110 to the position in which its centerline is beneath the pivot axis of the swing arm 112. It therefore biases the swing arm 112 downwardly.

Next, the operator engages the brakes 52 by pressing downwardly on the pad 90 to swing the brake pedal 80 clockwise into a service braking position. This pivoting motion causes the master cylinder actuating pin 102 to drive the roller 103 and master cylinder main piston 104 forwardly to effect service braking. After the service braking stroke ends, but before the brake pedal 80 reaches it latch point, the lug 166 on the swing arm 112 rides along the second leg 160 of the toggle arm 156 to hold the cam roller 138 away from the cam face 140 and to hold the dog 124 and cam 125 on the swing arm 112 away from the control arm. As a result, service braking and subsequent brake pedal depression toward the latch point occur without contact between the latching components of the locking mechanism 84, thereby avoiding the generation of contact sounds that otherwise could give a false audible indication of pedal locking. The over-center spring 114 remains in its first over-center position at this time. The control arm 110 therefore remains in the position in which it cannot latch against the swing arm 112. As a result, the brake pedal 80 will return to its released position if the operator removes his foot from the pad 90 without additional brake pedal depression.

At the end of service braking stroke and well beyond it, the lug 166 on the swing arm 112 clears the second leg 160 of the toggle arm 156 so that the swing arm 112 drops through an arc to a position in which the cam 125 engages the lug 122 on the control arm 110. This delayed dropping of the swing arm 112 has several benefits. For instance, as described above, it permits the dog 124 and cam 125 on the swing arm 112 to clear the detents 118 and 120 and the dog 122 on the control arm 110 so as to prevent a false audible indication of brake pedal locking. Moreover, it prevents the swing arm 112 from swinging towards its locked position until the over-center spring 114 is stretched sufficiently to store enough potential energy to effectively assist in swing arm movement into its locked position. In addition, the solid contact between the cam 125 and the lug 122 that occurs when the swing arm 112 drops into place produces a distinctive "clicking" sound that provides an audible indication to the operator that the brake pedal 80 has moved into a position in which it can be locked.

When the operator releases his foot from the brake pedal 80 after depressing it to its locked position, the brake pedal returns a very small amount to permit the over-center spring 114 to move from its first over-center position to the second over-center position as a result of the swing arm cam 125 pushing the control arm dog 122. As a result of this movement, the control arm 110 pivots rapidly from this position to the latched position. Because the dog 122 is located very close to the pivot axis of the control arm 110, a very small range of axial brake pedal movement (on the order of a few thousands of an inch) results in 60° or more of control arm pivoting movement. This relationship reduces the work required of the over-center spring 114 during the latching process. The second face 130 on the stop 126 now engages the second post 134 on the block 98, and the first or lower detent 118 on the control arm 110 now engages the dog 124 on the swing arm 112 to lock the swing arm 112 in position. This motion provides a distinctive clicking sound that provides an audible indication to the operator that the brake pedal 80 has been locked. The brake pedal 80 will thereafter remain in the locked position under the latching force of the control arm 110 when the operator releases the brake pedal 80. However, because the spring 114 is now in is second over-center position in which its centerline is above the pivot axis of the control arm 112, it biases the control arm 112 upwardly rather than downwardly, thereby priming the control arm 112 for subsequent release.

The holding force applied on the control arm 110 by the over-center spring 114 at this time should be large enough so as not to be overcome by any force that might inadvertently be placed upon or generated through the accelerator pedal 82 by virtue of the vehicle 30 being jostled during shipment or by rough treatment by errant operators. However, this holding force need not be very large because any moment arm which might tend to cause the swing arm 112 to swing out of its locked position is very small. As a result, a relatively weak spring (having a spring load on the order of 8–12 lb can be used as the over-center spring 114.

Figure 10:
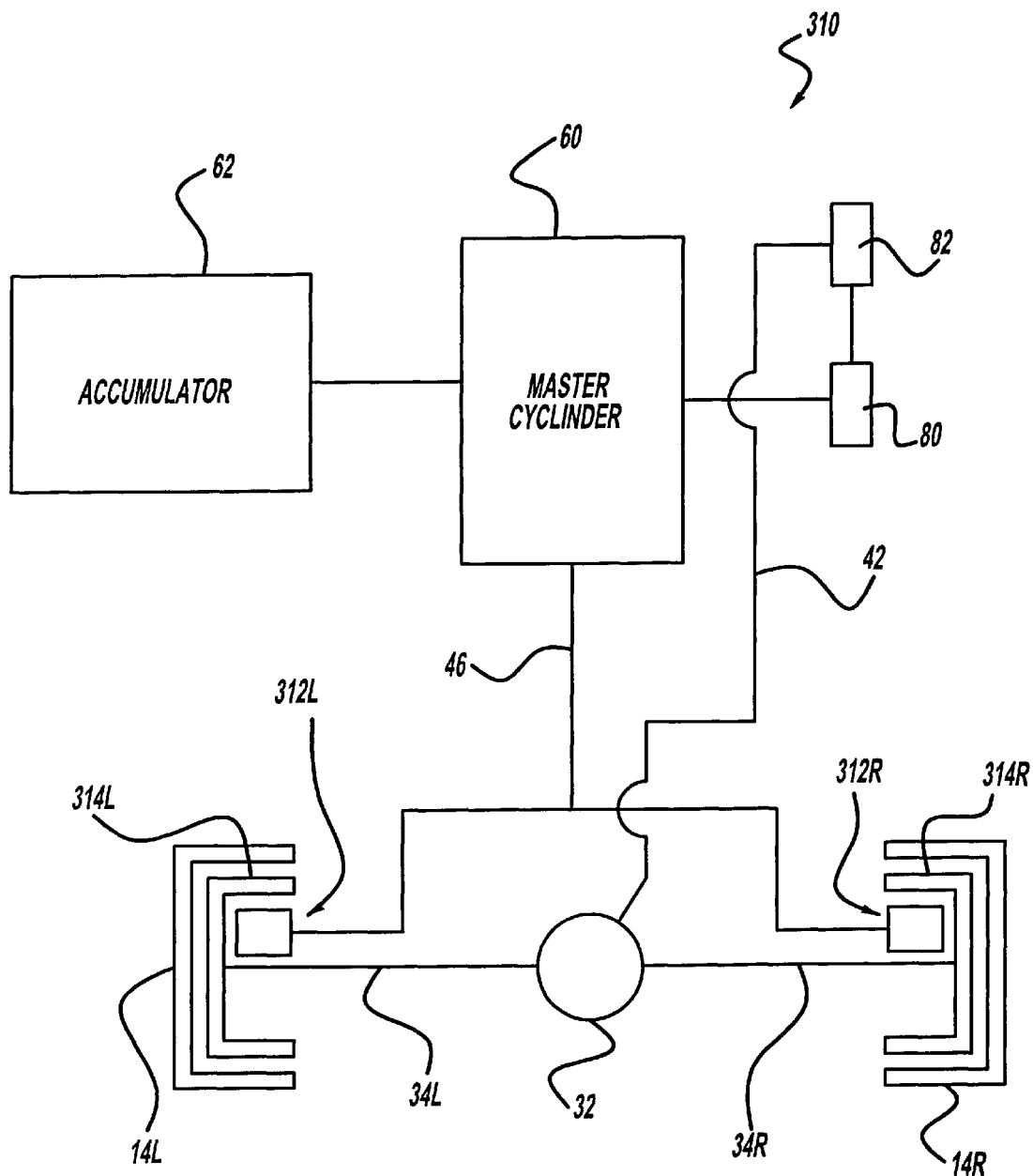
FIG. 10 is a block diagram of a brake system of the present invention utilizing a drum brake system.

The brakes 52 may be released by operating either the brake pedal 80 or the accelerator pedal 82 to unlatch the brake pedal 80 from its locked position. To release the brakes using the brake pedal 80, all the operator need do is depress the pedal 80 beyond its locked position to an overtravel position. This brake pedal movement and consequent swing arm movement will cause the dog 124 on the swing arm 112 to slip out of the first detent 118 on the control arm 110, permitting the over-center spring 114 to pull the swing arm 112 upwardly so that dog 124 snaps against the second detent 120 as seen in FIG. 10. The snapping action of the dog 124 against the detent 120 produces a distinctive click that apprises the operator that the brake pedal 80 is unlatched. As a result, the brake pedal 80 will return to its at-rest position under the biasing forces of the return spring 96 and the accumulator spring 246 when the operator releases the brake pedal 80.

The brake pedal 80 places a substantial moment on the swing arm 112 during the return stroke of the brake pedal 80. The dog 124 on the swing arm 112 produces a corresponding moment on the upper surface of the detent 120 of sufficient magnitude to pivot the control arm 110 counter-clockwise. The over-center spring 114 therefore moves back to its first over-center position so that it again biases the swing arm 112 downwardly. In addition, the lug 166 on the inner lateral surface of the swing arm 112 engages the second leg 160 of the toggle arm 156 during the return stroke to cause the toggle arm 156 to pivot clockwise to permit unobstructed movement of the lug 166 past the toggle arm 156. The toggle arm 156 then drops back into its initial position under the biasing force of the spring 164 so that it is primed for the next service braking cycle.

Brake pedal release using the accelerator pedal 82 occurs in similar sequence. The operator presses downwardly on the accelerator pedal 82 so that the lever arm 172 engages the kickoff arm 170. This engagement forces the swing arm 112 to swing clockwise about the pivot tube 142 to drive the control arm 110 to pivot as described above. As before, this movement unlatches the swing arm 112 from the control arm 110 and permits the brake pedal 80 to return to its at-rest position under the biasing force of the brake pedal return spring 96 and the accumulator spring 246. Also as before, this movement forces the control arm 110 and over-center spring 114 back to the initial position. Because the cutout 154 in the cam surface 140 is tangential to the swing arm pivot arc, the cam roller 138 simply moves circumferentially along the cam surface 140 during the initial, accelerator pedal imposed phase of the unlatching operation without resistance from the rather substantial return force imposed on the brake pedal 80 by the brake pedal return spring 96 and the accumulator spring 246. Brake pedal unlatching therefore imparts little resistance to accelerator pedal motion, and brakes 52 are disengaged after the first 1-3 inches of accelerator pedal stroke with minimal operator effort. As a result, the operator can "feather" accelerator pedal motion so that the brakes 52 can be disengaged without overdepressing the accelerator pedal 82. This eliminates jerky motion or quick starts often associated with golf carts and other light-duty vehicles.

The master cylinder 60 and hydraulic accumulator 62 are configured to translate the mechanical actuating forces generated by brake pedal depression into hydraulic pressure that first engages the brakes 52 and that then stores additional energy for holding the brakes 52 in their engaged condition. This energy storage provides several benefits. For instance, it permits the brake system 50 to make up for "creep" or fluid pressure loss that may occur due, e.g., relaxation of elastomeric components of the system. Moreover, it can assist in returning the brake pedal 80 to its at rest position following release of a locked brake pedal.

Referring to FIGS. 4, 5, 7, and 8, the master cylinder 60 is generally conventional. It includes a housing 200 having an internal horizontal bore 202 formed therein. A reservoir 204 is formed above the bore 202 for storing hydraulic fluid. The bore 202 has an upper fill inlet 206 and a rear outlet 208. The inlet 206 cooperates with the reservoir 204. The rear outlet 208 opens into an accumulator chamber 210, detailed below. The master cylinder main piston 104 is slidably mounted in the bore 202 so as to extend rearwardly from the rear end of the bore 202 and into contact with the roller 103. As a result of this arrangement, 1) depression of the brake 80 and consequent swinging movement of the actuator pin 102 and roller 103 drives the main piston 104 forwardly through the bore 206 to pressurize the outlet 208, and 2) release of the brake pedal 80 permits the main piston 104 to move rearwardly through the bore 202 to depressurize the outlet 208.

Referring to FIG. 7, accumulator chamber 210, as well as the remainder of the accumulator 62, may be located at any pressurized point in the braking system 50. In the illustrated embodiment, however, the chamber 210 is formed in an extension 212 of the master cylinder housing 200 extending essentially colinearly with the bore 202 so as to reduce the number of parts in the accumulator 62 and to facilitate assembly. The accumulator chamber 210 has a first orifice 218 in a rear wall thereof that opens directly into the master cylinder outlet 208, and a second orifice 220 in an upper wall thereof that communicates with a bleeder port 222 and a brake supply orifice 224 in the master cylinder housing extension 212. The orifice 224 is connected to the front and/or rear vehicle brakes 52 via associated brake lines 46 of FIG. 2.

An accumulator drive piston 214 and a one-way restrictor valve 216 are mounted in the accumulator chamber 210. The accumulator drive piston 214 is slidably mounted in the chamber 210 so as to extend beyond a rear end of the master cylinder extension 212 and into contact with the accumulator spring assembly 58. The one-way restrictor valve is positioned forwardly of the accumulator drive piston 214 and is biased toward the front of the chamber 210 by a return spring that is seated on the one-way restrictor valve 216 at its front end and on the accumulator drive piston 214 at its rear end.

The purpose of the one-way restrictor valve 216 is to damp return fluid flow into the master cylinder 60 from the accumulator chamber 210 upon release of the brakes 52, thereby inhibiting the pronounced brake pedal snapback effect exhibited by most park and hold brake systems of this type. The energy stored in the accumulator 62 and the brakes 52 instead is released more gradually, permitting a much smoother brake pedal return.

The hydraulic accumulator 62 performs several beneficial functions. For instance, it reduces the effort required by the operator to depress the brake pedal 80 to its locked position. It also stores energy generated upon manual pressurization of the hydraulic fluid in a form that can then be used to maintain the brakes 32 in their engaged positions after the brake pedal 80 is locked. Finally, it assists in returning the brake pedal 80 to its released position upon brake pedal unlocking. The preferred accumulator structure is one that has a minimum number of components and that can be readily assembled as a unit offsite and then attached to the remainder of the brake assembly 50 by an unskilled operator. Towards these ends, the hydraulic accumulator 62 is a spring type accumulator taking the form best seen in FIG. 7. It includes a retainer 240, a movable compression plate 242 disposed at the rear end of the retainer 240, a cap 244 affixed to the front end of the retainer 240, and a compression spring 246 captured between the compression plate 242 and the cap 244.

The retainer 240 includes a front mounting plate 248 and a plurality (preferably two) straps 250 that extend rearwardly from the mounting plate 248. The mounting plate 248 has an internally threaded post 252 and a pair of tangs 254 located radially outside of the post 254 and bent in opposite directions. The threaded center post 252 screws onto external threads 256 on the master cylinder housing extension 212, and the tangs 254 lock into slots 258 in the front wall 72 of the support bracket 66 when the post 252 is fully tightened onto the master cylinder housing extension 212. The accumulator 62 can subsequently be unscrewed from the master cylinder housing extension 212 only by overtorquing the accumulator 62 in a counter-clockwise direction to release the tangs 254 from the slots 258. The straps 250 serve as mounts for the cap 244 and are configured to guide and support both the spring 246 and the compression plate 242. Each strap 250 extends rearwardly from the mounting plate 248 and terminates in a hook 260 at its distal end. The bodies of the straps 250 serve as supports and guides for the compression plate 242 and the spring 246. The hooks 260 latch onto the cap 244 as detailed below to fix the cap in place.

The compression plate 242 includes a rear annular spring support portion 262 and a cup portion 264. The cup portion 264 extends axially forwardly from the center of the rear spring support portion 262 to a front nut portion 266. Spring support portion 262 presents a seat for the rear end of the accumulator spring 246. Cup portion 264 is configured to surround the end of the master cylinder housing extension 212 and to abut the front end of the accumulator drive piston 214. Apertures 268 are formed in the spring support portion 262 for passage of the straps 250. Upon assembly, this relationship between the straps 250 of the retainer 240 and the apertures 268 in the compression plate 242 permits the compression plate 242 to move axially relative to the retainer 240 but prevents relative rotational movement between the compression plate 242 and the retainer 240.

The cap 244 comprises a metal annular ring having a circular axially front end portion 270 and inner and outer circular flanges 272 and 274. The flanges 272 and 274 extend rearwardly from the front end portion 270 so as to form a groove serving as a second seat for the spring 246. A pair of hook receiving apertures are formed in the front end portion 270 adjacent to corresponding notches 278. The notches 278 are configured to receive the straps 250 and the hooks 260 of the retainer 240, thereby locking the cap 244 onto the retainer 240.

The spring 246 is precompressed a substantial amount as a result of a preassembly process. As discussed in more detail below, this spring precompression sets a threshold pressure below which substantially all work performed by the master cylinder 60 is applied toward fluid pressurization and above which the majority of the work performed by the master cylinder 60 is applied toward energy storage in the accumulator 62. The amount of precompression required for a particular pressurization threshold level will vary depending on the spring rate of the spring 246 and its caged height. The spring 246 of the illustrated embodiment has a free length of about 9" and a spring rate of 25 lbs/in. It is precompressed to an installed length of approximately 4" during the assembly process to provide a threshold pressure of about 800–850 psi.

The precompression of the accumulator spring 246 is selected to set the threshold pressure to a level well above the lockup point of the brakes 52 but well below the single latch point of the brake pedal 80. In a system in which the brake pedal is latched in position 8" into its stroke, service braking is performed in the first 2 to 3" of brake pedal stroke even under panic stop conditions. In fact, brake lockup typically occurs after no more than 2½" of brake pedal stroke. Typical lockup points for fully burnished and unburnished brakes are denoted as such in FIG. 8.

Additional brake pedal depression past the threshold point 286 compresses the accumulator spring 246, thereby storing the energy of master cylinder actuation in the form of potential energy in the spring 246. System pressure rises at a much slower rate during this phase of pedal actuation, as represented by the shallow portion 288 of the curve 282. This effect results from the fact that the incremental increase in input force required to compress the spring 246 is substantially lower than the incremental increase in input force required to additionally pressurize the hydraulic fluid. As a result, resistance to brake pedal movement during this second phase of brake pedal actuation increases at a much slower rate than during the first phase.

Figure 9:
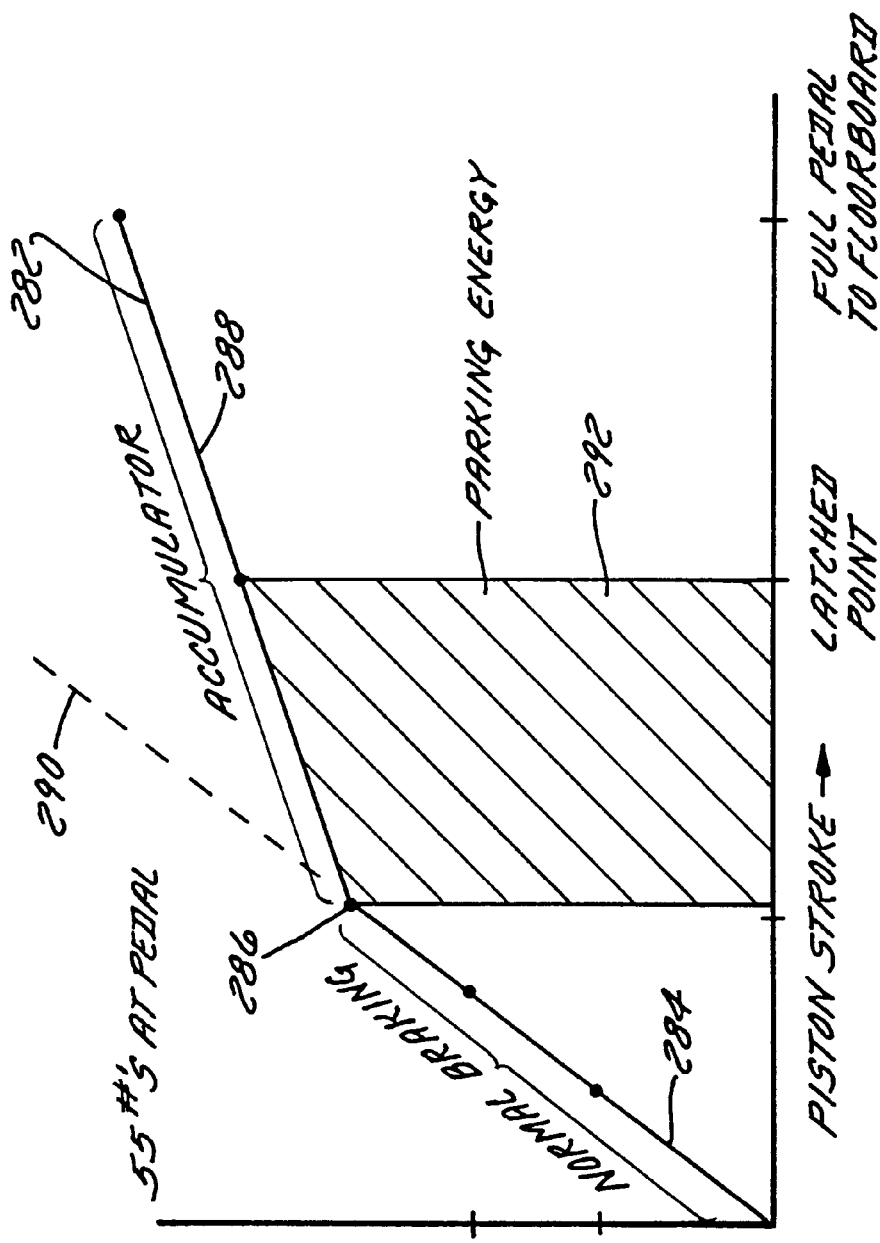
FIG. 9 is a graph depicting hydraulic pressure as a function of brake pedal displacement.

In the illustrated embodiment, the transition point 286 between the first and second phases of brake pedal actuation occurs at approximately 800–850 psi of hydraulic pressure. Pressure thereafter rises gradually to about 900–950 psi when the brake pedal 80 is latched in its locked position and the end of the second phase of its actuation stroke. The compression spring 246 is compressed about ½" at this time. At least 50%, and possibly at least 65% or more, of the total pedal stroke required to latch the brake pedal 80 in its locked position is consumed in the second phase of brake pedal actuation. As a result, by the end of this phase, more than ample energy is stored in the accumulator 62 to hold the brakes 52 and to return the brake pedal 80 with little additional effort by the operator. (The amount of energy stored by the accumulator 62 is represented by the hatched area 292 under the curve 282 in FIG. 9.) Considerable work is performed over the rather lengthy second phase of the brake pedal actuation stroke, but at much lower input forces than would be required to perform the same amount of work (and hence to store the same amount of energy) over a shorter stroke. In fact, the transition point 286 is reached at an operator input force of about 35 lbs, and only an additional 25 lbs of input force is required to depress the brake pedal 80 to its latch point. This is in contrast to the drastically higher input force that would be required to pressurize the fluid to a much higher level if the operator were to press the brake pedal 80 to its latch point without an accumulator in the system (see the phantom line 290 in FIG. 9). Hence, the accumulator 62 greatly facilitates brake pedal latching and reduces the precision required to achieve the latch point because the operator strokes the pedal a great distance easily.

Upon brake pedal release, the one-way restrictor valve 216 immediately seats against the front end of the chamber 210 under the force of the return spring 230, thereby preventing rapid depressurization of the accumulator chamber 210. The damping effect provided by this restricted fluid flow imposes a relatively low return speed on the brake pedal 80 that continues for a period of time. The brake pedal 80 consequently returns to its initial position without any undesirable rapid snapback that otherwise would produce substantial wear and tear on the system and even risk injury to the operator. The damping grease between the brake pedal pivot shaft 86 and the stationary sleeve 92 additionally damps brake pedal return movement at this time. However, the combined damping effect provided by the one-way restrictor valve 216 and the damping grease does not overly-damp brake pedal return. Instead, the brake pedal 80 is biased by the springs 96 and 246 to quickly follow the operator's foot without pushing the foot upwardly too fast. The remaining, small snapback impact forces resulting from this moderate return speed are absorbed by the elastomeric bumper 148 on the swing arm 112 when the brake pedal 80 reaches its at-rest or fully released position, resulting in a virtually noiseless and vibration less pedal return.

FIG. 10 depicts a hydraulic brake system 310 arranged similarly to hydraulic brake system 50 of FIGS. 1–3. Hydraulic brake system 310 utilizes a drum brake system rather than a disk brake system to apply braking force at the wheels. Components of hydraulic system 310 which are similar to the components described with respect to FIGS. 1–3 will be referred to using identical reference numerals.

Of particular interest in FIG. 10, brake system 310 is embodied as a drum brake system which includes a brake cylinder and shoe assembly 312 which operates in response to hydraulic fluid pressure applied through hydraulic control line 46. Brake cylinder and shoe assembly 312 includes a brake cylinder which presses brake shoes radially outward against brake drum 314. Brake drum 314 on its outboard side connects to wheels 14. Application of hydraulic fluid pressure through hydraulic control lines 46 causes brake cylinder and shoe assembly 312 to press against brake drum 314, thereby generating a frictional force retarding movement of wheels 14. Accordingly, hydraulic brake system 310 operates as described above, except that application of braking pressure occurs through a drum brake system rather than through a disk brake system.

Figure 11:
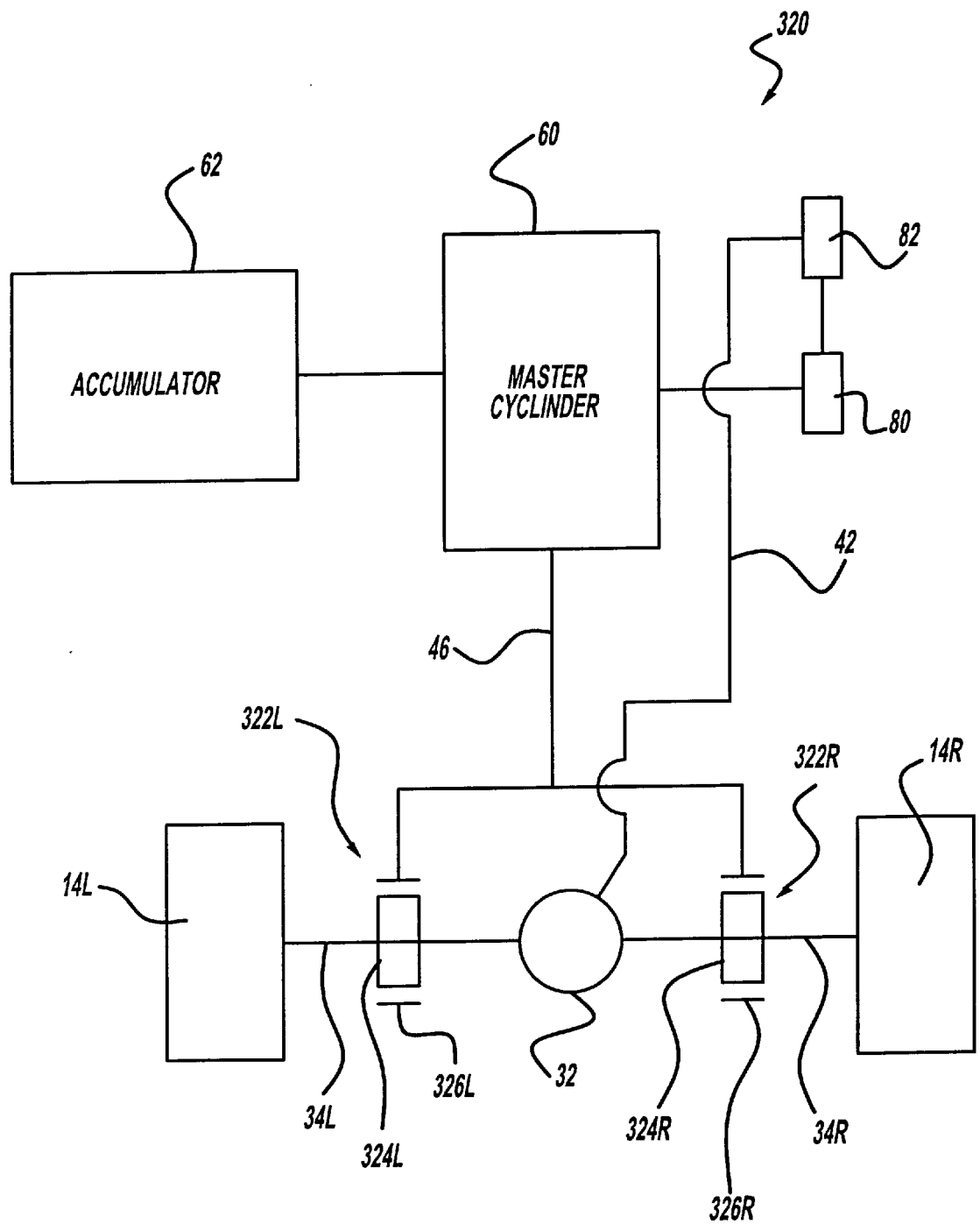
FIG. 11 is a block diagram of the brake system of the present invention utilizing a brake band system.

In yet another embodiment of the present invention, FIG. 11 depicts a hydraulic brake system 320 which utilized a band brake system to retard movement of drive shafts 34. FIG. 11 is generally arranged as described above with respect to FIGS. 1–3 and 10 except that the brake mechanism will be described with respect to a band brake system, rather than a disk or drum brake system. Accordingly, like reference numerals from these figures will be used to described similar components in FIG. 11.

Hydraulic brake system 320 utilizes displacement of brake pedal 80 and linkage 42 to generate a hydraulic fluid pressure from master cylinder 60 into hydraulic control lines 46. Hydraulic control lines 46 operate a band brake assembly 322. Band brake assembly 322 includes a brake cylinder 324 rigidly connected to drive shaft 34. Brake cylinder 324 is encircled by brake band 326. In response to hydraulic to fluid pressure, brake band 326 circumferentially restricts around brake cylinder 324 to generate a frictional force. A frictional force retards movement of drive shafts 34 and correspondingly retards movement of wheels 14 to thereby crate a braking force. When hydraulic fluid pressure in hydraulic control line 46 is reduced, brake band 326 reduces the circumferential constriction thereby reducing the braking force.

Figure 12:
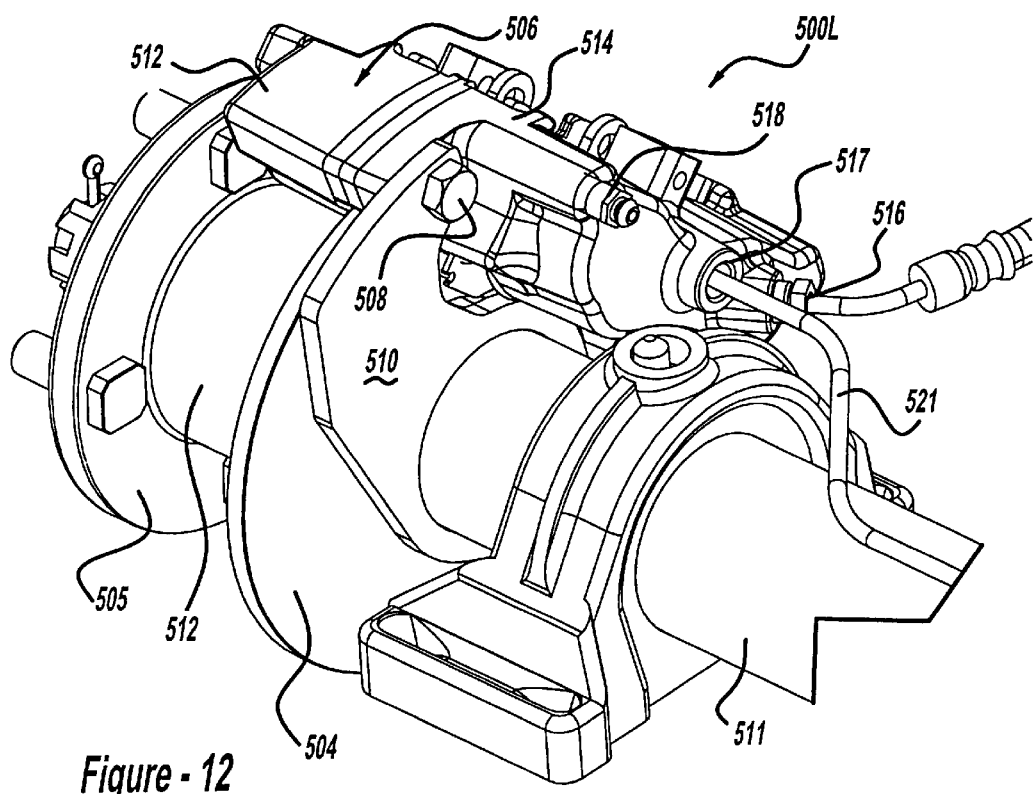
FIG. 12 is an interior perspective view of a hub and caliper assembly.

FIGS. 12–17 show a preferred embodiment of caliper assembly 48 and its interconnection to golf car 10. FIG. 12 shows a left brake assembly 500L which is composed of the integral hub and rotor assembly 502 which has a rotor portion 504 and a wheel hub portion 505. Brake assembly 500L further has a caliper assembly 506 which is attached by two through bolts 508 to affixed flange 510 rigidly mounted to the rear axle housing 511.

Caliper assembly 506 has a caliper outboard half subassembly 512 and a caliper inboard half subassembly 514. Caliper inboard half 514 has an input fluid port 516 for receiving fluid from the hydraulic brake line 521 and a fluid output port 517 for providing fluid to the right brake system 500R (see FIG. 13). Caliper inboard half subassembly 514 has a bleeder valve 518 for bleeding air from the brake lines 521 during repair or installation.

Figure 13:
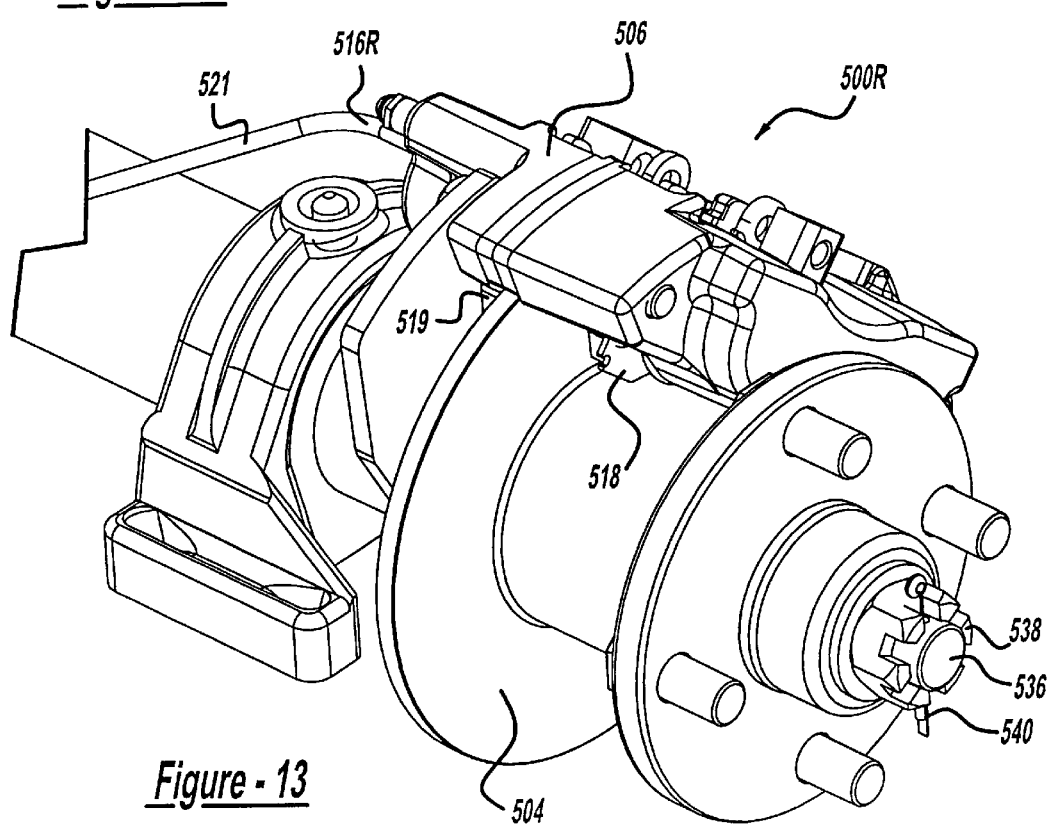
FIG. 13 is an exterior perspective view of a hub and caliper assembly.

FIG. 13 shows a right brake assembly 500R, which is composed of the same components as those shown in the left brake assembly 500L of FIG. 12, in mirror image form. Caliper assembly 506 holds a pair of brake pads 518 and 519 adjacent to rotor 504 of the integrated hub and rotor assembly 502. Pads 518 and 519 move in response to hydraulic force generated by fluid under pressure applied to input port 516R. The integrated hub and rotor assembly 502 is held onto drive shaft 536 by a hex castle nut 538 and cotter pin 540.

Figure 14:
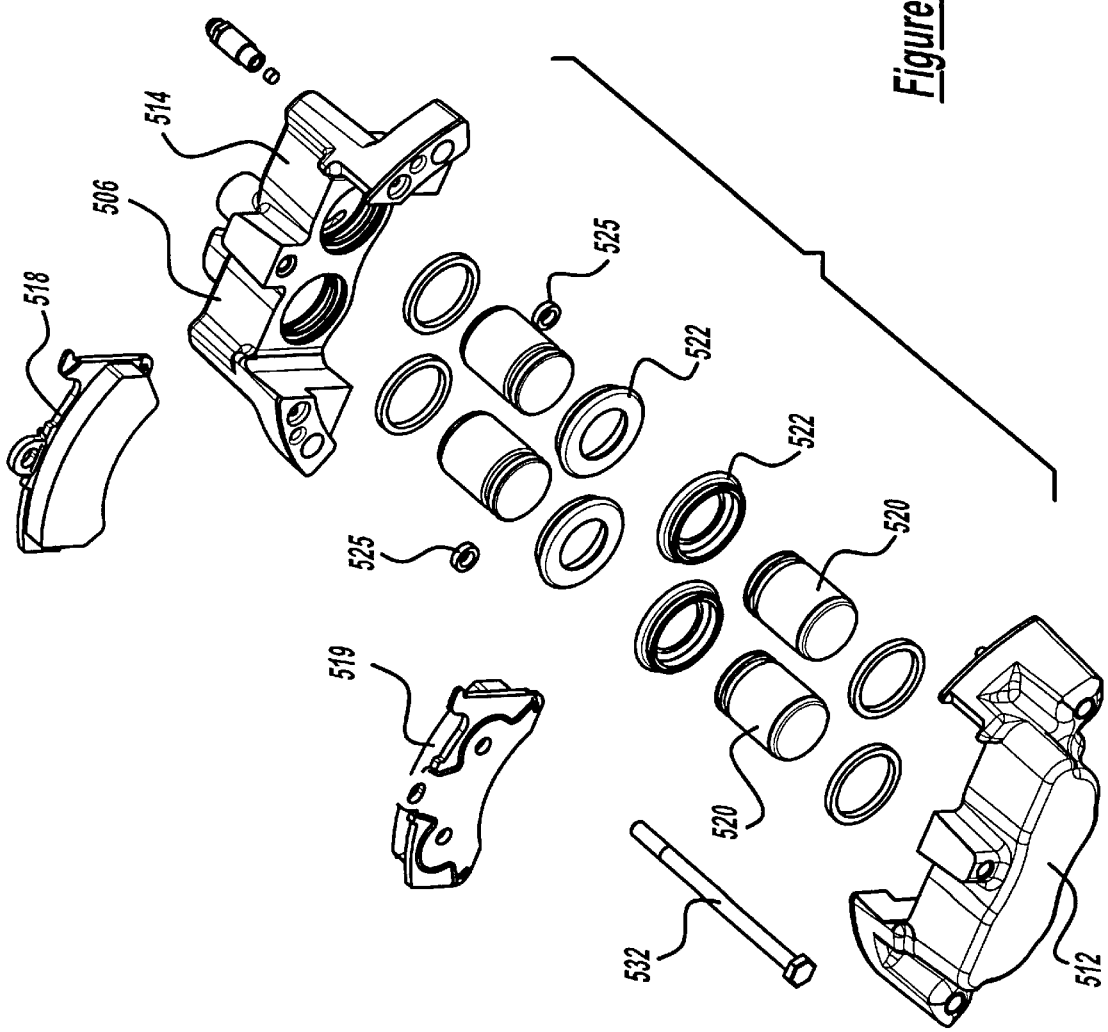
FIG. 14 is an exploded view of a caliper assembly of FIGS. 12 and 12.

FIG. 14 shows an exploded view of caliper assembly 506, which reveals that the caliper inboard half subassembly 514 and caliper outboard half subassembly 512 each have a pair of piston actuators 520. Each actuator has a conventional polymeric outside seal 522, which elastically deforms when the pistons are moved forwardly to press against the brake pads 518 and 519, and which undeform to pull the piston away from the rotor portion 504 when the fluid pressure is removed. Between the halves of the caliper 506 is a pair of conventional elastomeric O-rings 525 which function to help prevent leakage of hydraulic fluid moving through internal passages within each half sub assembly 512 and 514 and between the halves of the caliper 506. Disposed immediately adjacent the O-rings 225 is a pair of through holes 528 for accepting through mounting bolts 530 (not shown) (in FIG. 14). Also shown is through bolt 532 which functions to secure brake pads 519 and 518 in their proper alignment with the rotor portion 504. Wire spring clips 542 and 544 generally are further provided to hold the brake pads in place.

Figure 15:
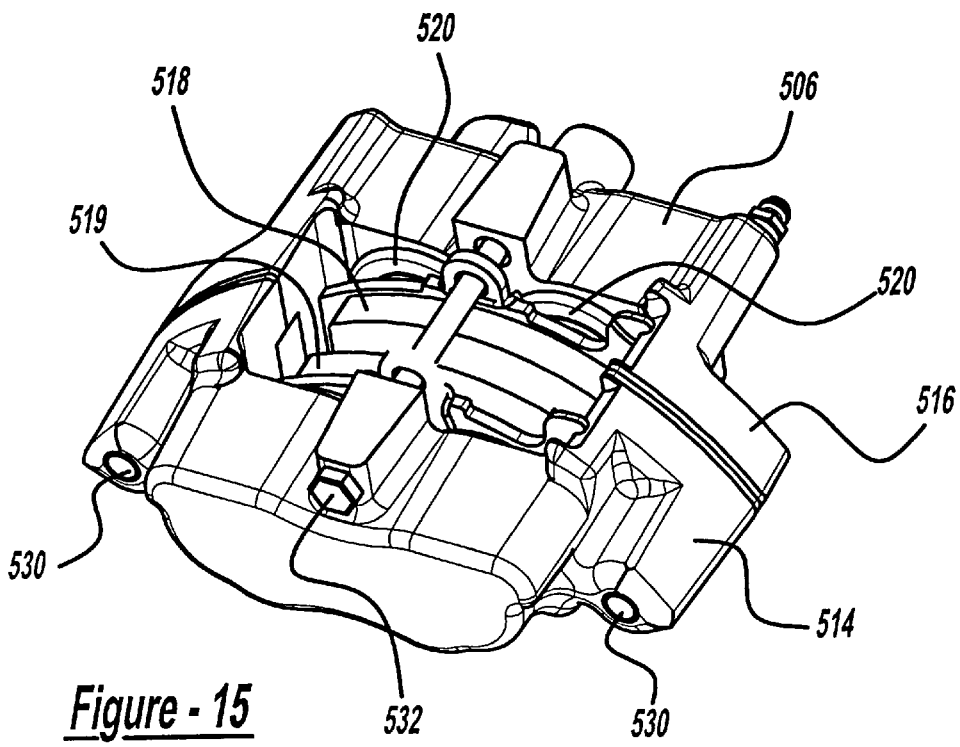
FIG. 15 is an expanded perspective view of the caliper assembly.

FIG. 15 is a perspective view of caliper assembly 506 of the current invention. Shown are the through bolts 530 which function to hold the caliper inboard half subassembly 514 and caliper outboard half subassembly 516 together. Also shown are through bolts 532 holding the brake pads 518 and 519 in proper position between the piston actuators 520.

Figure 16:
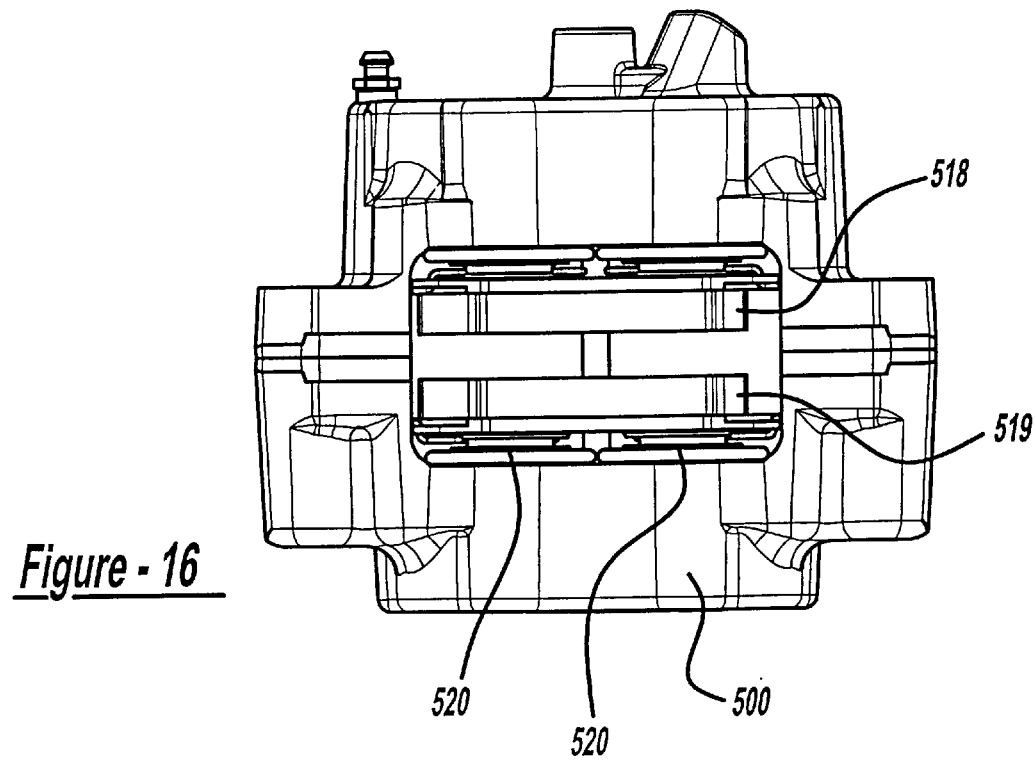
FIG. 16 is a bottom view of the caliper assembly.

FIG. 16 shows a bottom view of the caliper brake assembly 500. Shown is the relationship of the pads 518 and 519 with the actuating pistons 520. As can be seen, the pads 518 and 519 define a space wherein the rotor portion 504 is located.

Figure 17:
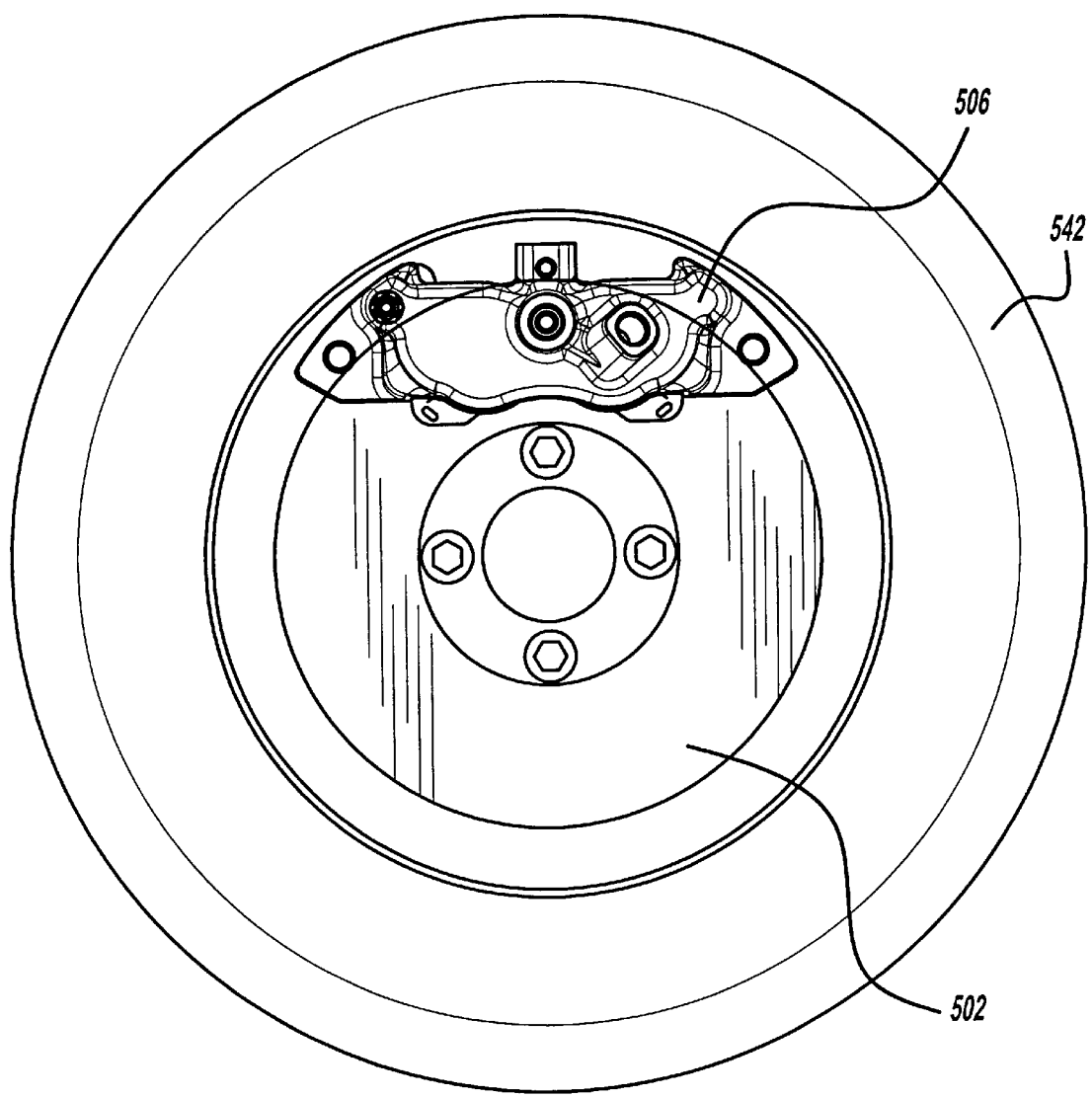
FIG. 17 as an elevational view of the integral wheel, hub, and rotor assembly.

FIG. 17 is a diagram of the integral wheel hub and rotor assembly with caliper disposed within the small diameter of the golf cart wheel 542. As can be seen, the low profile caliper 506 can fit within the small diameter of the golf cart wheel. The lower profile of the caliper 506 allows for incorporation of a disk brake system onto a golf cart.

Further details of the brake caliper assembly 506 will now be described. Subassembly 512 includes a metal caliper housing preferably prepared from an iron or aluminum alloy casting, and subassembly 514 includes a similarly made metal caliper housing. Each of these caliper housings may be precision-machined to conventional tolerances to have their flat exterior mating surfaces, the through holes, and substantially cylindrical pockets for receiving the brake pistons, that are shown in the FIGS. 12 through 15, formed to proper size. Using conventional techniques, internal passages for hydraulic fluid are formed within caliper housings to provide hydraulic fluid from the inlet port to the backside of the respective brake piston pockets. Flat machined surfaces on the end portions of one caliper housing of subassembly 512 match up with and bear tightly against corresponding flat machined surfaces on the caliper housing of subassembly 514 when the two mounting bolts 530 are drawn tightly against the rigid mounting flange 510 to which the overall assembly 506 is rigidly mounted. The side face of mounting flange 510 contacting the adjacent caliper housing of assembly 512 is parallel to the rotor 504. The through holes in the caliper housings for the mounting bolts 530 are perpendicular to these machined surfaces, thus ensuring that faces of the brake caliper pistons are sufficiently parallel to the parallel opposed faces of rotor 504 to ensure substantially uniform wear on brake pads 518 and 519.

Each through bolt is substantially centrally positioned relative to opposed flat machined surfaces of the end portions of the caliper housings of caliper subassemblies 512 and 514. In this manner, tightening bolts 530 ensures slight compression of O-rings 525, to eliminate the possibility of any hydraulic leak between the adjacent housings. Since only two bolts are required to mount caliper the assembly 512 to flange 510, minimal effort is required for final assembly to the vehicle axle. This means that brake caliper assembly 512 can be fully assembled in a location remote from the final assembly plant for the small utility vehicle, function-tested, and then shipped while filled with hydraulic fluid if desired.

Caliper assembly 506 has a low compact profile when viewed in side elevation. As best shown in FIG. 17, the clearance between the radially outermost points of caliper housings of subassemblies 512 and 514, and the inner generally cylindrical rim surface of the wheel are preferably in the range of about 3 mm (about 0.1 inch) to about 20 mm (about 8/10 inch), with a range of about 5 mm (about 2/10 inch) to about 12 mm (about 2 inch) being presently preferred. Such tight clearances are made possible in part by using sufficiently thick and stiff caliper housings which are further rigidified and stabilized by the use of two quality mounting bolts 530 and a sufficiently stiff mounting flange to avoid any significant lateral or radial flexing or distortion of the caliper assembly during intense braking, up to and including full rotor/wheel lock-up. In this regard, the outer end portions of caliper housings through which the through bolts 530 are run, are as shown generally thicker (that is, in the direction of the axis of the rear axle of the vehicle) than they are high (that is, a the radially outward direction from the axis of the rear axle of the vehicle).

The use of two sets of opposing pistons in the opposed half caliper subassemblies 512 and 514 also provides additional benefits. First, the opposed piston arrangement provides balanced opposing forces on opposite sides of the rotor, thus allowing high hydraulic braking forces to be applied. Secondly, the two piston actuators 520 in subassembly 512 are slightly angularly spaced apart from one another. By using two spaced-apart brake pistons on each caliper subassembly, a generally oblong, kidney-shaped relatively thick brake pad may be used as shown, thus maximizing the amount of surface area of the brake pad. Its large size helps minimize the rate of brake pad surface wear during repetitive braking over a period of months and years. The oblong brake pads are preferably made in any conventional or suitable manner, with reinforcing a back plate portion as shown, to help ensure minimal deflection and good contact between the rotor surface and brake pad surface, even in the central region of the brake pad between the two brake pistons. Armed with the teachings and illustrations within the present disclosure, the design and construction of compact, low-profile dual piston brake caliper assembly of the present invention with its long-life brake pads need not be further described, since the design and construction of larger, less space-efficient conventional two-piston and four-piston brake caliper assemblies are well understood, and details from those design and construction techniques, where space and compact is not an issue, can be readily adapted into the present environment.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A golf car comprising:
    a frame supported on a plurality of wheels;
    a prime mover, the prime mover providing driving force to selected ones of the plurality of wheels to displace the golf car;
    an integrated brake pedal and accelerator pedal assembly; and
    a hydraulically operated brake system, the brake system receiving input from the brake pedal and generating an output to control a hydraulically operated braking device,
    wherein the brake system operates in a normal mode by partially depressing the brake pedal and wherein the brake system operates in a parking mode by depressing the brake pedal further, and wherein when the brake system is in the parking mode, the brake system may be released by depressing one of the brake pedal and accelerator pedals.

2. The apparatus of claim 1 further comprising an accumulator for storing braking energy when in a parking mode, the accumulator maintaining a predetermined minimum hydraulic pressure throughout the brake system when in parking mode or operation.

3. The apparatus of claim 1 wherein the hydraulically operated brake system further comprises:
    a brake rotor attached to at least one of the wheels of the golf car; and
    a first caliper assembly having brake pads which contact the brake rotor in response to the brake system output to cause friction, the friction retarding movement of the brake rotor and associated wheel.

4. The apparatus of claim 3 further comprising a second caliper assembly having brake pads which contact the brake rotor in response to the brake system output to cause friction, the friction retarding movement of the brake rotor and associated wheel, the first and second caliper assemblies cooperatively retarding movement of the brake rotor.

5. The apparatus of claim 1 wherein the brake pedal has a range of travel, wherein a first portion of the range of travel is less than a second portion of the range of travel, and wherein the first portion of the range of travel corresponds to the normal mode and a second portion of the range of travel corresponds to the parking mode.

6. The apparatus of claim 5 wherein a substantial portion of overall braking force is applied when the brake pedal travels through the first portion of the range.

7. The apparatus of claim 1 wherein the brake pedal has a range of travel, and the range of travel includes a detent, wherein the detent defines a lock position for the parking mode, and wherein only a single detent position exists to define the parking mode.

8. The apparatus of claim 1 further comprising a dampener, the dampener dampening release of the brake pedal from the normal and parking modes.

9. The apparatus of claim 1 further comprising an accumulator, the accumulator storing energy for maintaining a braking force in the parking mode.

10. The apparatus of claim 9 wherein the accumulator comprises a mechanical spring.

11. The apparatus of claim 9 wherein the accumulator comprises a gas spring.

12. The apparatus of claim 1 wherein the hydraulically operated brake system further comprises:
    a brake drum attached to at least one of the wheels of the golf car; and
    a first shoe assembly having brake shoes which contact the brake drum in response to the braking system output to cause friction, the friction retarding movement of the brake drum and associated wheel.

13. The apparatus of claim 12 further comprising a second shoe assembly having brake pads which contact the brake drum in response to the braking system output to cause friction, the friction retarding movement of the brake drum and associated wheel, the first and second shoe assemblies cooperatively retarding movement of the brake drum and associated wheel.

14. The apparatus of claim 1 further comprising:
    a drive shaft connected between the prime mover and the selected ones of the plurality of wheels,
    wherein the hydraulically operated brake system further comprises a brake cylinder connected to the drive shaft and a band brake for applying friction to the cylinder in response to the braking system output to retard movement of the drive shaft, the band brake being operated by hydraulic pressure from the hydraulically operated brake system.

15. A brake system for a golf car comprising:
    an integrated brake pedal and accelerator pedal assembly; and
    a hydraulic brake actuation system, the brake actuation system receiving input from the brake pedal and generating an output to control a hydraulically operated braking device; and
    an accumulator for storing braking energy when in a parking mode, the accumulator maintaining a predetermined minimum hydraulic pressure throughout the brake system,
    wherein the brake system operates in a normal mode by partially depressing the brake pedal and wherein the brake system operates in a parking mode by depressing the brake pedal further, and wherein when the brake system is in the parking mode, the brake system may be released by depressing one of the brake pedal or accelerator pedals.

16. The apparatus of claim 15 wherein the hydraulically operated brake system further comprises:
    a first primary friction member attached to at least one of the wheels of the golf car; and
    a first complementary friction member which contacts the first primary friction member to cause friction, the first complementary friction member being operable by the hydraulic brake actuation system for selectively causing friction between the first primary and complementary friction members, the friction retarding movement of the associated wheel.

17. The apparatus of claim 16 wherein the first primary friction member comprises a brake rotor and the first complementary friction member comprises a brake pad.

18. The apparatus of claim 16 wherein the first primary friction member comprises a brake drum and the first complementary friction member comprises a brake shoe.

19. The apparatus of claim 16 wherein the hydraulically operated brake system further comprises:
   a second primary friction member attached to the at least one of the wheels of the golf car; and
   a second complementary friction member which contacts the second primary friction member to cause friction, the second complementary friction member being operable by the hydraulic brake actuation system for selectively causing friction between the second primary and complementary friction members, the friction retarding movement of the brake rotor and associated wheel, wherein the first and second primary and complementary friction members cooperatively retard movement of the associated wheel.

20. The apparatus of claim 15 wherein the brake pedal has a range of travel, wherein in a first portion of the range of travel is less than a second portion of the range of travel, and wherein the first portion of the range of travel corresponds to the normal mode and a second portion of the range of travel corresponds to the parking mode.

21. The apparatus of claim 20 wherein a substantial portion of overall braking force is applied when the brake pedal travels through the first portion of the range.

22. The apparatus of claim 15 wherein the brake pedal has a range of travel, and the range of travel includes a detent, wherein the detent defines a lock position for the parking mode, and wherein only a single detent position exists to define the parking mode.

23. The apparatus of claim 15 further comprising a dampener, the dampener dampening release of the brake pedal from the normal and parking modes.

24. The apparatus of claim 15 wherein the accumulator comprises a mechanical spring.

25. The apparatus of claim 15 wherein the accumulator comprises a gas spring.

26. A golf car comprising:
   a frame supported on a plurality of wheels;
   a prime mover, the prime mover providing driving force to selected ones of the plurality of wheels to displace the golf car;
   an integrated brake pedal and accelerator pedal assembly, the brake pedal having a range of travel, a first portion of the range of travel defining a service mode of operation and a second portion of the range of travel defining a parking mode of operation, the integrated brake pedal and accelerator pedal assembly including a lock position for the parking mode of operation and generating a single audible sound when depressed to the lock position; and
   a hydraulically operated brake system, the brake system receiving input from the brake pedal and generating an output to control a hydraulically operated braking device,
   wherein when the brake system is in the parking mode, the brake system may be released by depressing one of the brake pedal or accelerator pedals.

27. The apparatus of claim 26 further comprising an accumulator for storing braking energy when in a parking mode, the accumulator maintaining a predetermined minimum hydraulic pressure throughout the brake system.

28. The apparatus of claim 26 wherein the first portion of the range of travel is less than the second portion of the range of travel.

29. The apparatus of claim 26 wherein a substantial portion of overall braking force is applied when the brake pedal travels through the first portion of the range.

30. The apparatus of claim 26 wherein the lock position includes a detent, wherein the detent defines the lock position for the parking mode, and wherein only a single detent position exists to define the lock position.

31. The apparatus of claim 26 further comprising a dampener, the dampener dampening release of the brake pedal from the normal and parking modes.

32. A golf car comprising:
   a frame supported on a plurality of wheels;
   a prime mover, the prime mover providing driving force to selected ones of the plurality of wheels to displace the golf car;
   an integrated brake pedal and accelerator pedal assembly;
   a hydraulically operated brake system, the brake system receiving input from the brake pedal and generating a hydraulic output signal;
   a brake rotor attached to at least one of the wheels of the golf car; and
   a first caliper assembly having brake pads displaceable in accordance with the hydraulic output signal, the brake pads contacting the brake rotor to cause friction, the friction retarding movement of the brake rotor and associated wheel,
   wherein the brake system operates in a normal mode by partially depressing the brake pedal and wherein the brake system operates in a parking mode by depressing the brake pedal further, and wherein when the brake system is in the parking mode, the brake system may be released by depressing one of the brake pedal or accelerator pedals.

33. The apparatus of claim 32 wherein the caliper is disposed between the brake rotor and at least one of the plurality of wheels.

34. The apparatus of claim 33 wherein the caliper has a low profile to enable disposition between the brake rotor and the selected on of the plurality of wheels.

35. The apparatus of claim 33 further comprising an accumulator for storing braking energy when in a parking mode, the accumulator maintaining a predetermined minimum hydraulic pressure throughout the brake system when in a parking mode of operation.

36. The apparatus of claim 32 further comprising a second caliper assembly having brake pads which contact the brake rotor in response to the hydraulic output signal to cause friction, the friction retarding movement of the brake rotor and associated wheel, the first and second caliper assemblies cooperatively retarding movement of the brake rotor.

37. The apparatus of claim 36 wherein the second caliper assembly is disposed between the brake rotor and the selected one of the plurality of wheels.

38. The apparatus of claim 37 wherein the second caliper has a low profile to enable disposition between the brake rotor and the selected one of the plurality of wheels.

39. The apparatus of claim 32 wherein the brake pedal has a range of travel, wherein in a first portion of the range of travel is less than a second portion of the range of travel, and wherein the first portion of the range of travel corresponds to the normal mode and a second portion of the range of travel corresponds to the parking mode.

40. The apparatus of claim 39 wherein a substantial portion of overall braking force is applied when the brake pedal travels through the first portion of the range.

41. The apparatus of claim 32 wherein the brake pedal has a range of travel, and the range of travel includes a detent, wherein the detent defines a lock position for the parking mode, and wherein only a single detent position exists to define the parking mode.

* * * * *

UNITED STATES PATENT AND TRADEMARK OFFICE
CERTIFICATE OF CORRECTION

PATENT NO. : 6,223,865 B1
DATED : May 1, 2001
INVENTOR(S) : Lang et al.

It is certified that error appears in the above-identified patent and that said Letters Patent is hereby corrected as shown below:

Column 3,
Line 41, after "principles" insert -- of --.
Line 65, second occurrence of "12" should be -- 13 --.

Column 4,
Line 2, "as" should be -- is --.
Line 11, "12" should be -- 14 --.
Line 35, "FIGS." should be -- FIG. --.

Column 6,
Line 40, "Hygorscopic" should be -- Hygroscopic --.

Column 7,
Line 20, "stationery" should be -- stationary --.

Column 11,
Line 50, "is" should be -- its --.
Line 63, delete "(" before "having".

Column 16,
Line 53, "crate" should be -- create --.

Column 18,
Line 45, delete "a".

Column 22,
Line 34, replace "on" with -- one --.

Signed and Sealed this

Eighth Day of October, 2002

*Attest:*

JAMES E. ROGAN
*Attesting Officer*     *Director of the United States Patent and Trademark Office*